O. THIEME.
TALLY ROLL ATTACHMENT FOR CALCULATING MACHINES.
APPLICATION FILED MAY 20, 1916.
1,288,288. Patented Dec. 17, 1918.
15 SHEETS—SHEET 1.
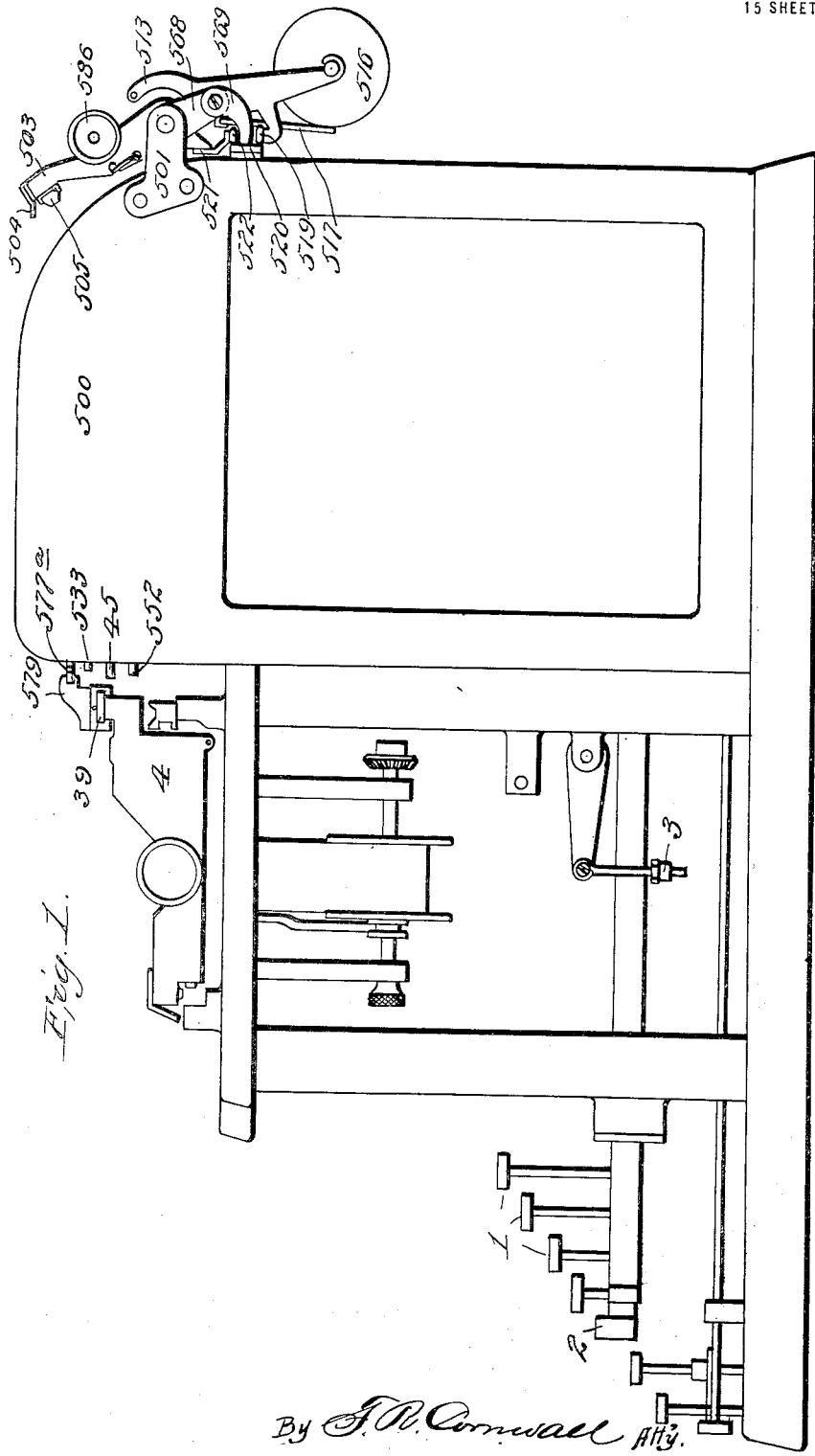
Inventor
O. Thieme
By J. R. Cornwall Atty.

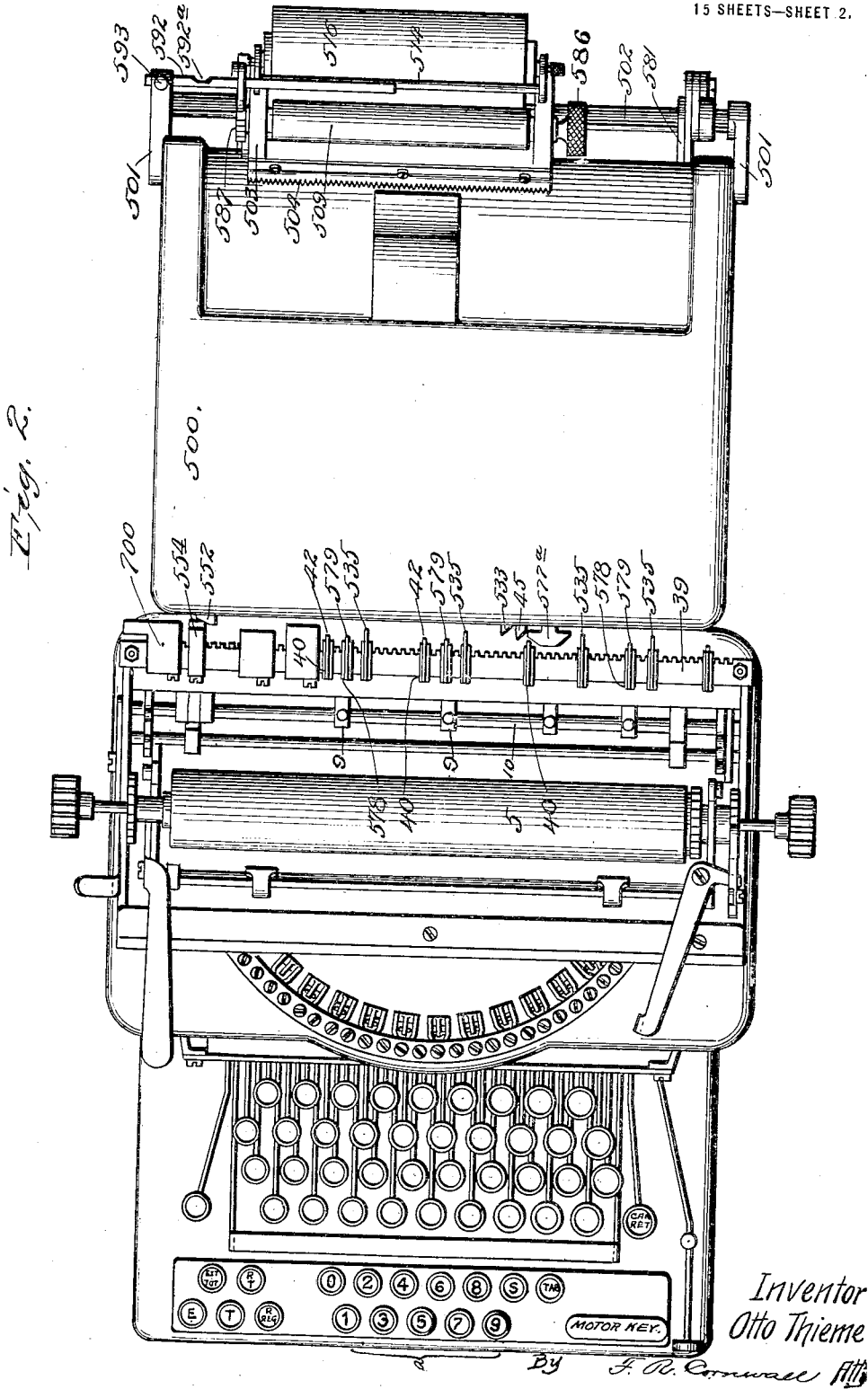

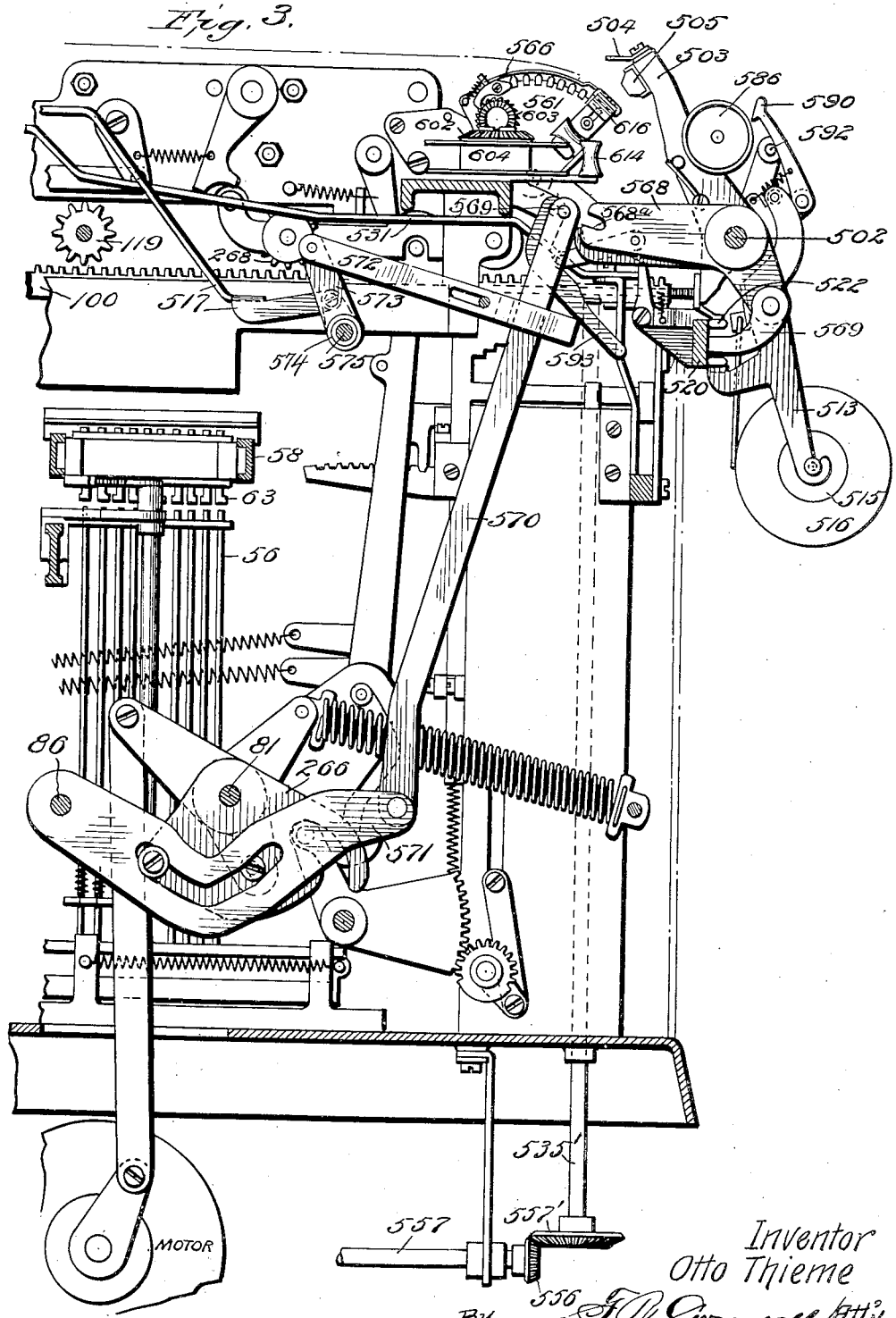

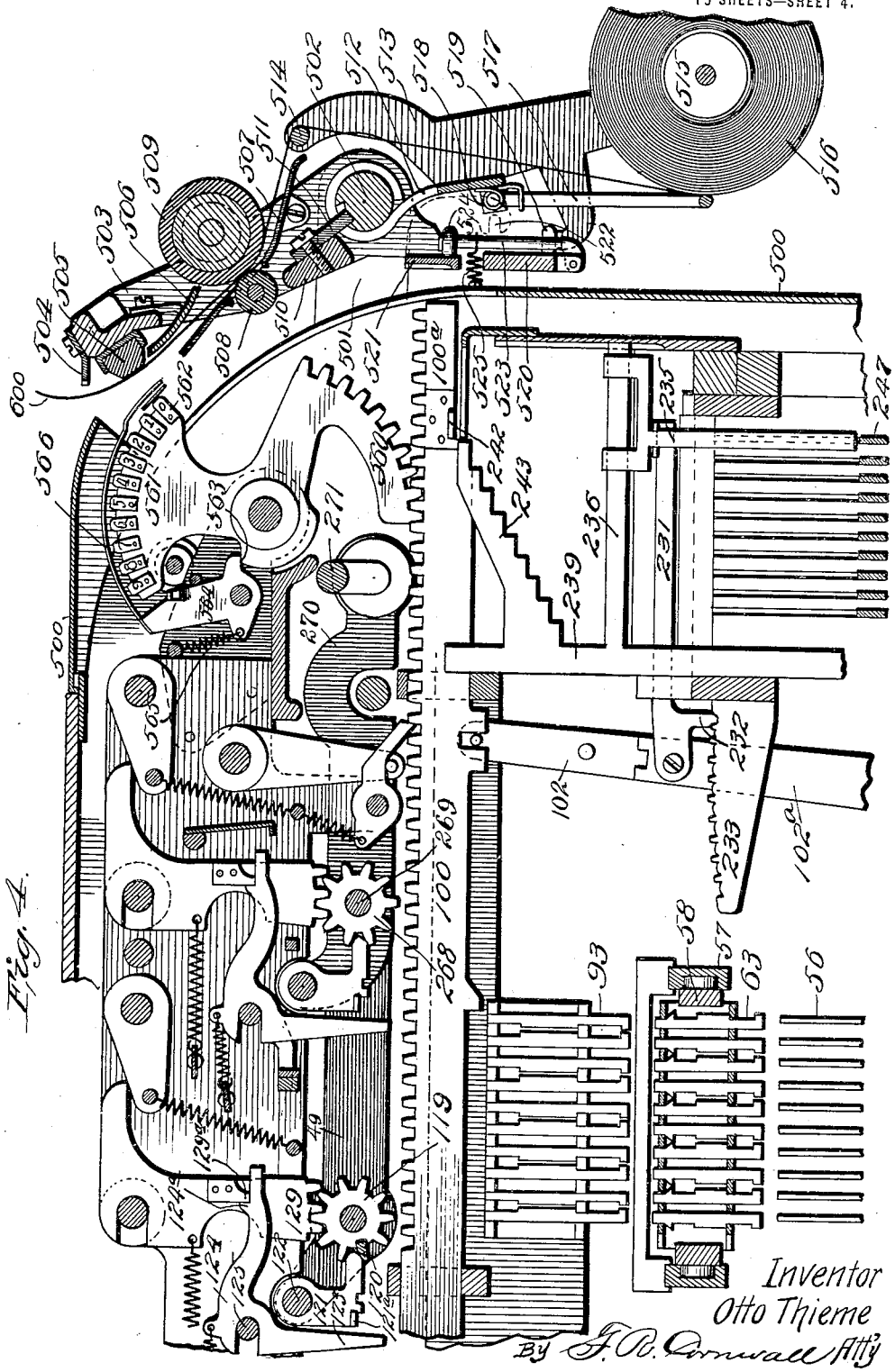

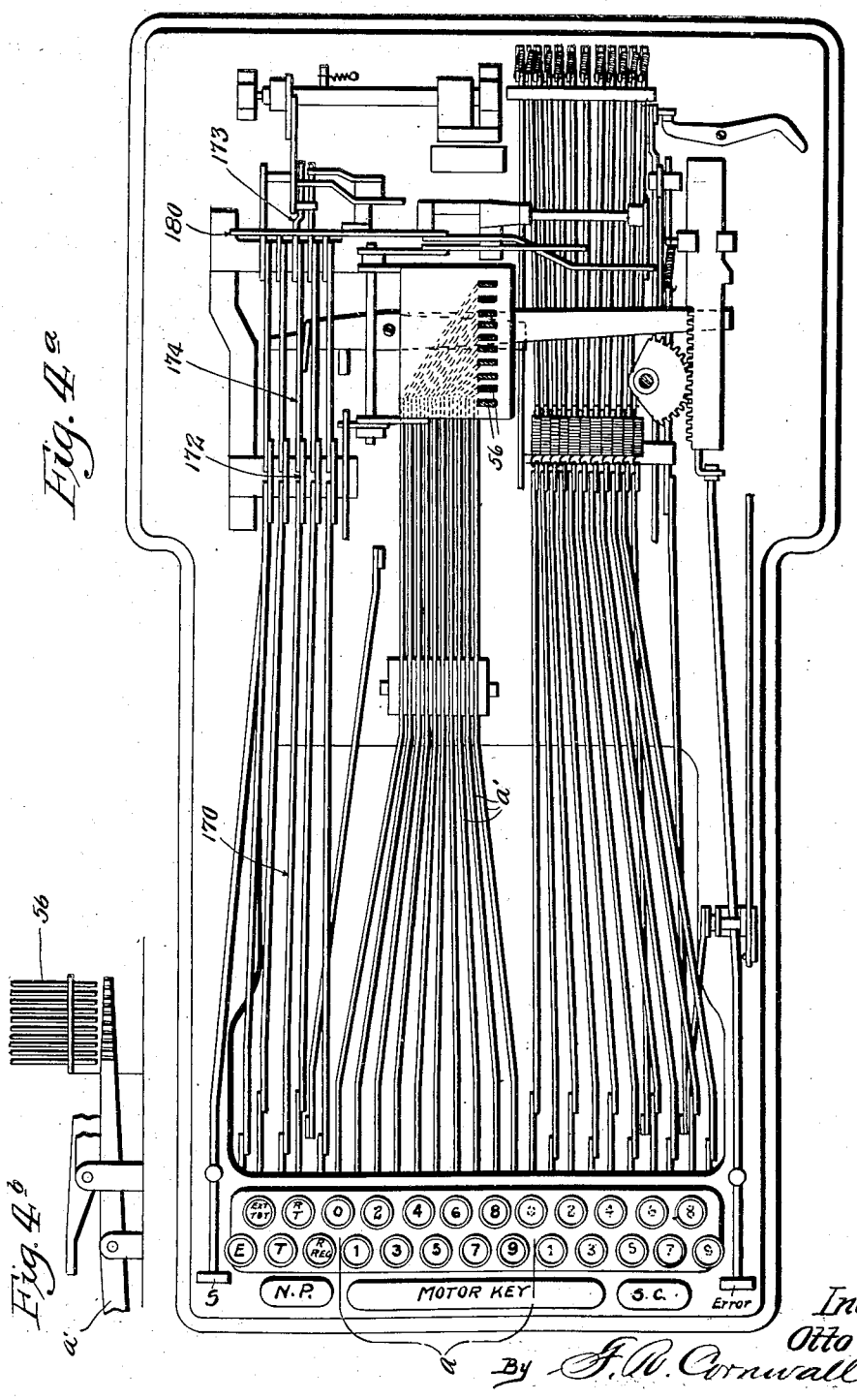

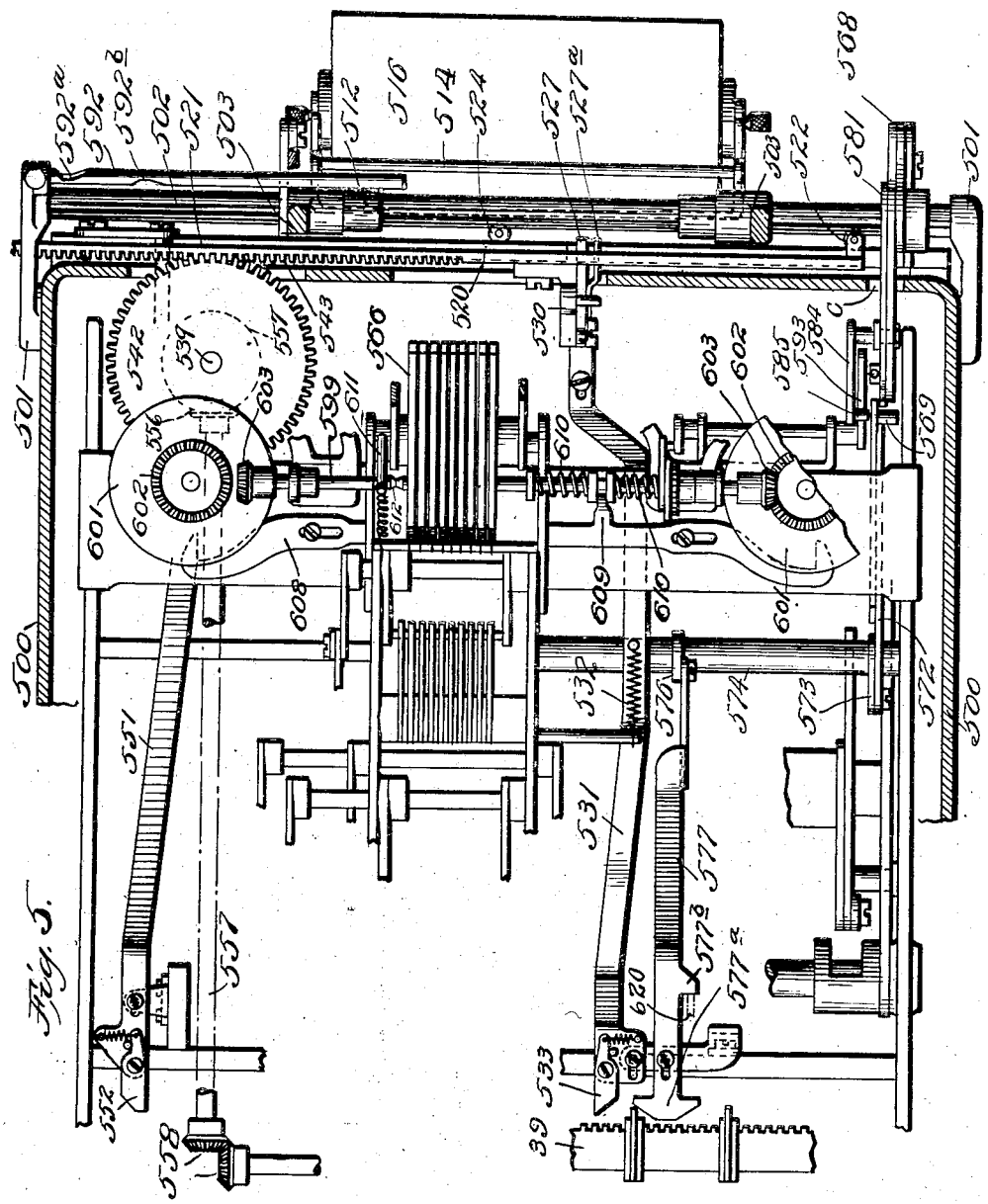

O. THIEME.
TALLY ROLL ATTACHMENT FOR CALCULATING MACHINES.
APPLICATION FILED MAY 20, 1916.
1,288,288.
Patented Dec. 17, 1918.
15 SHEETS—SHEET 7.
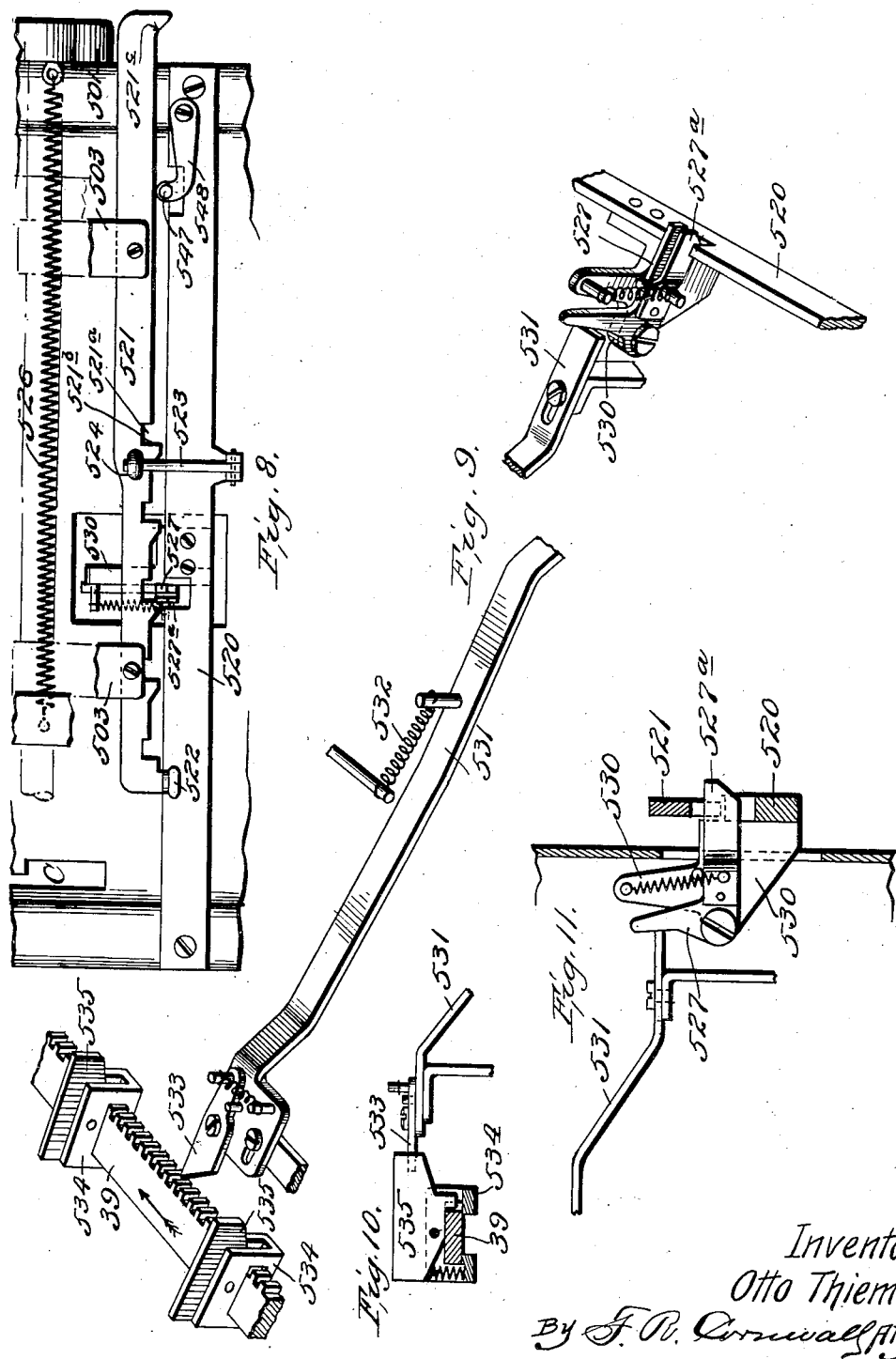
Inventor
Otto Thieme

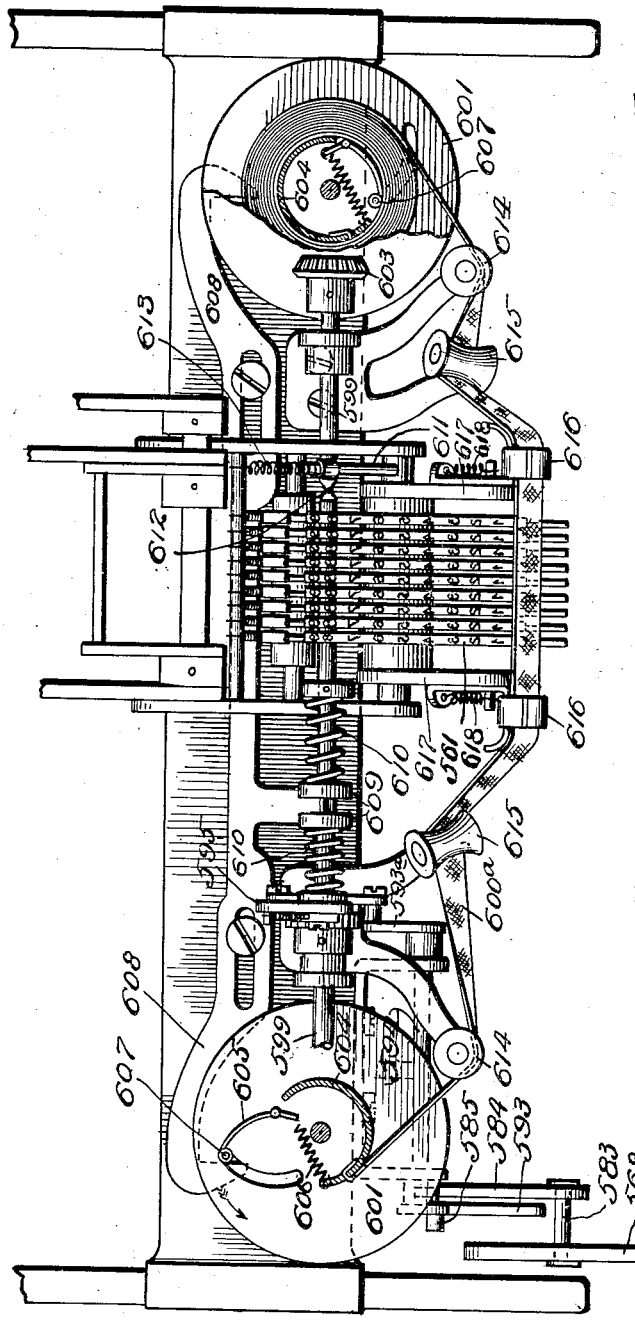

O. THIEME.
TALLY ROLL ATTACHMENT FOR CALCULATING MACHINES.
APPLICATION FILED MAY 20, 1916.
1,288,288.
Patented Dec. 17, 1918.
15 SHEETS—SHEET 9.
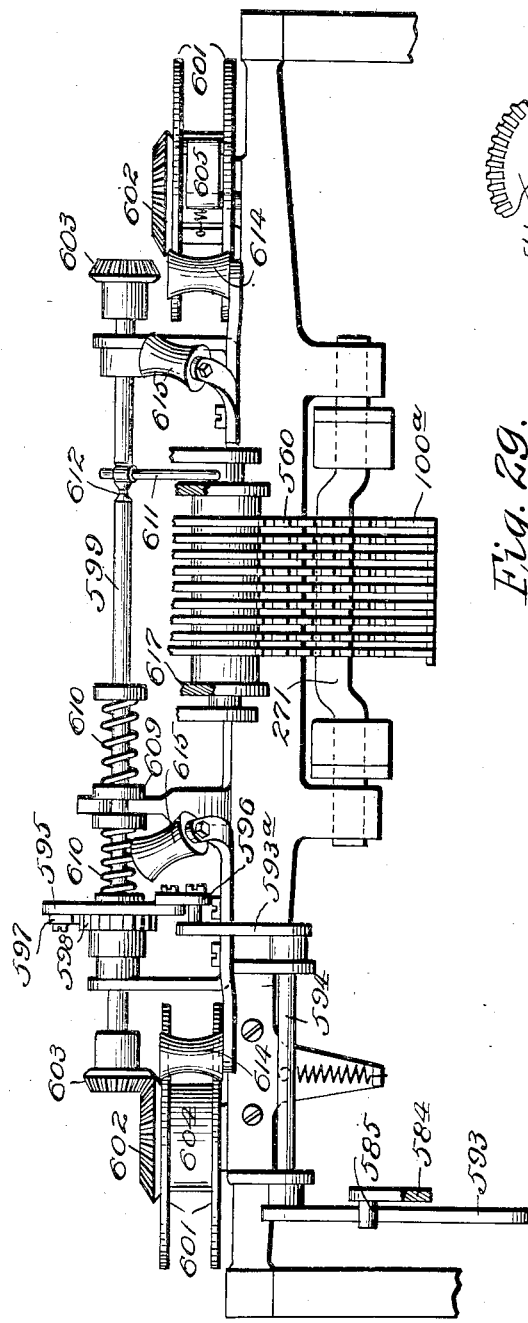
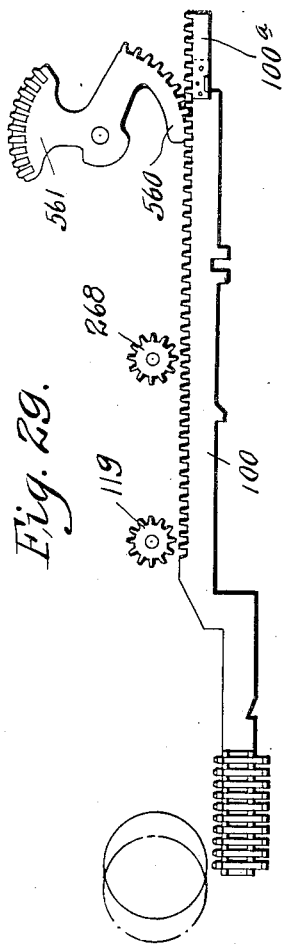
Inventor
Otto Thieme
By F. R. Cornwall Atty.

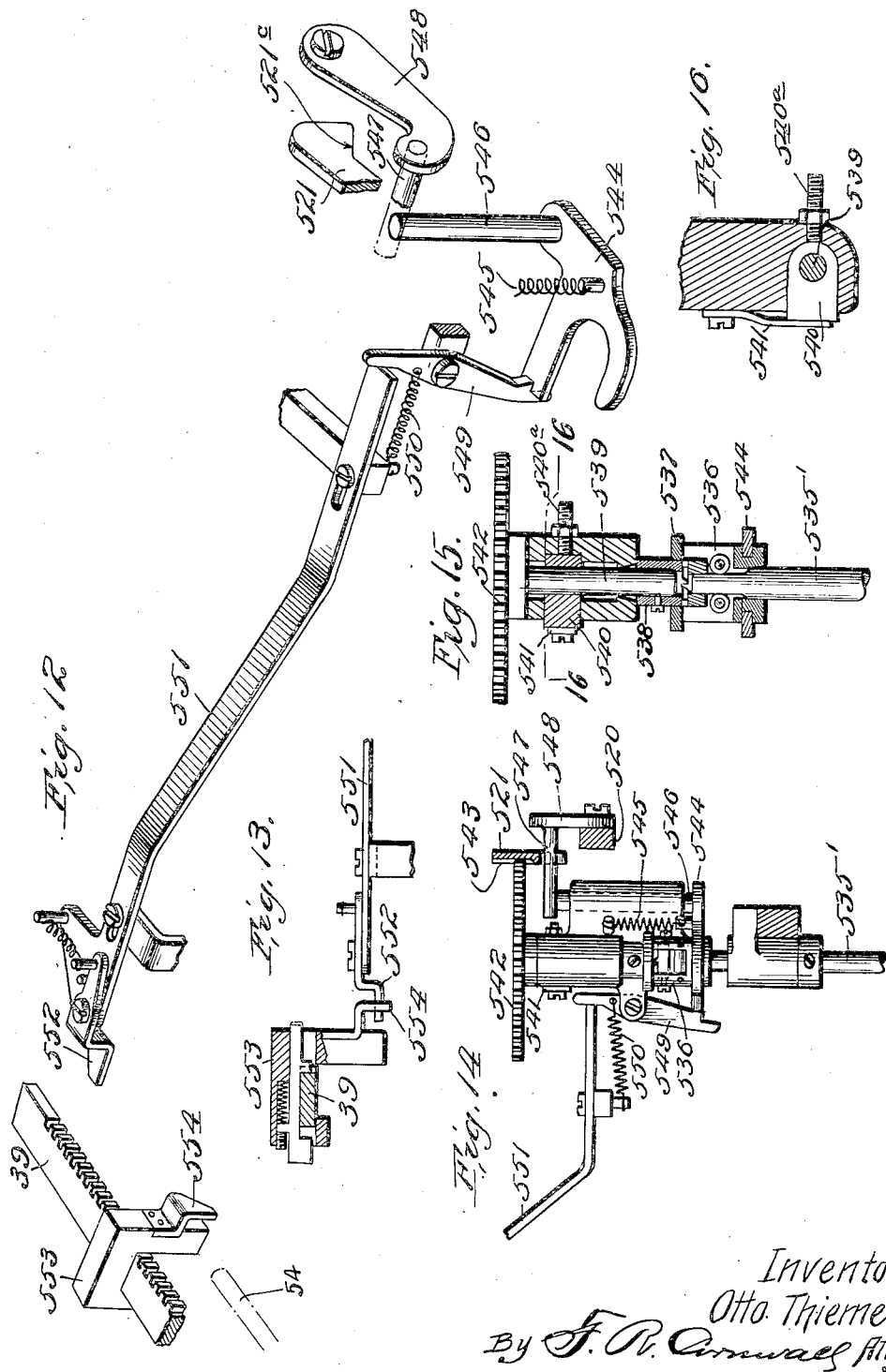

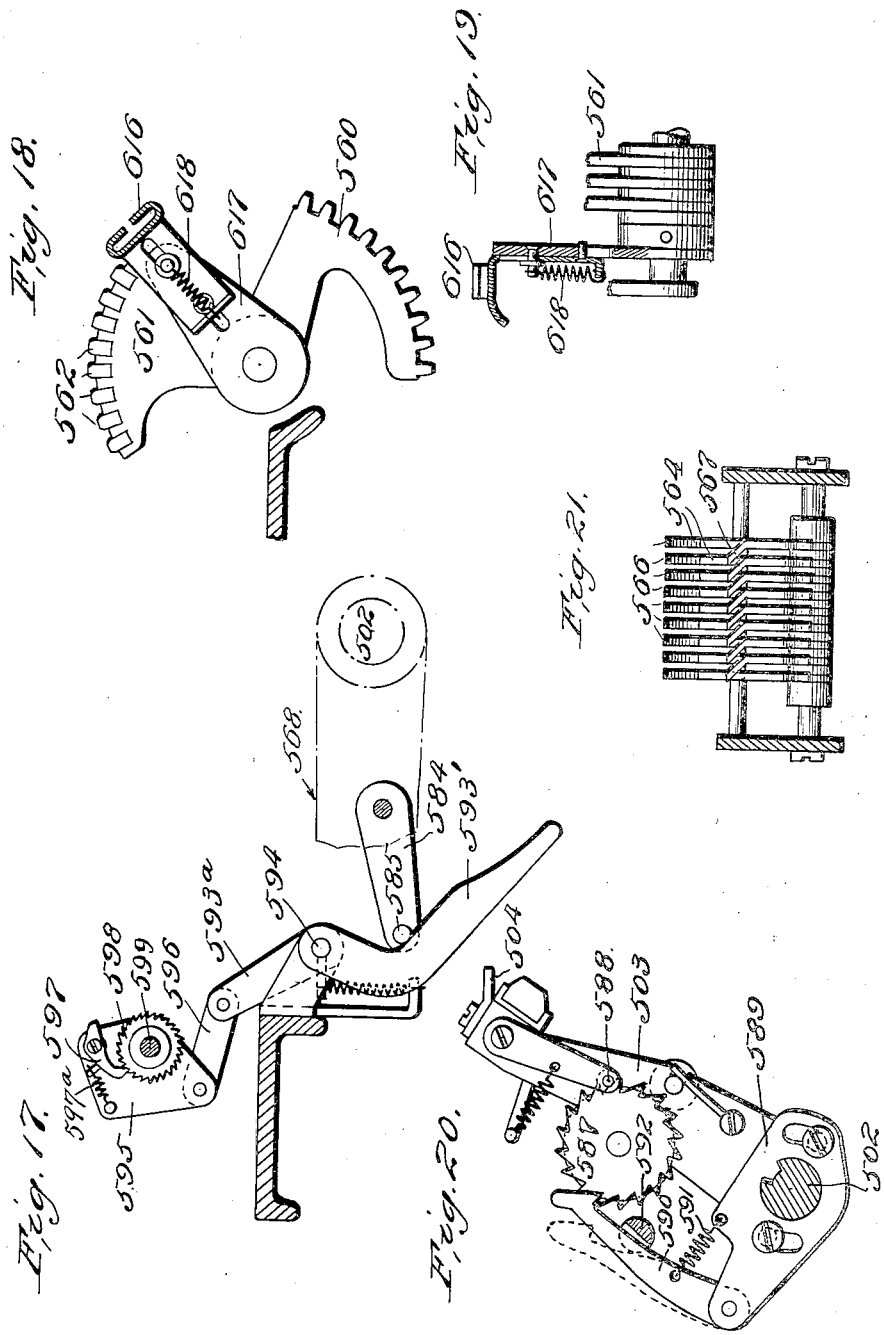

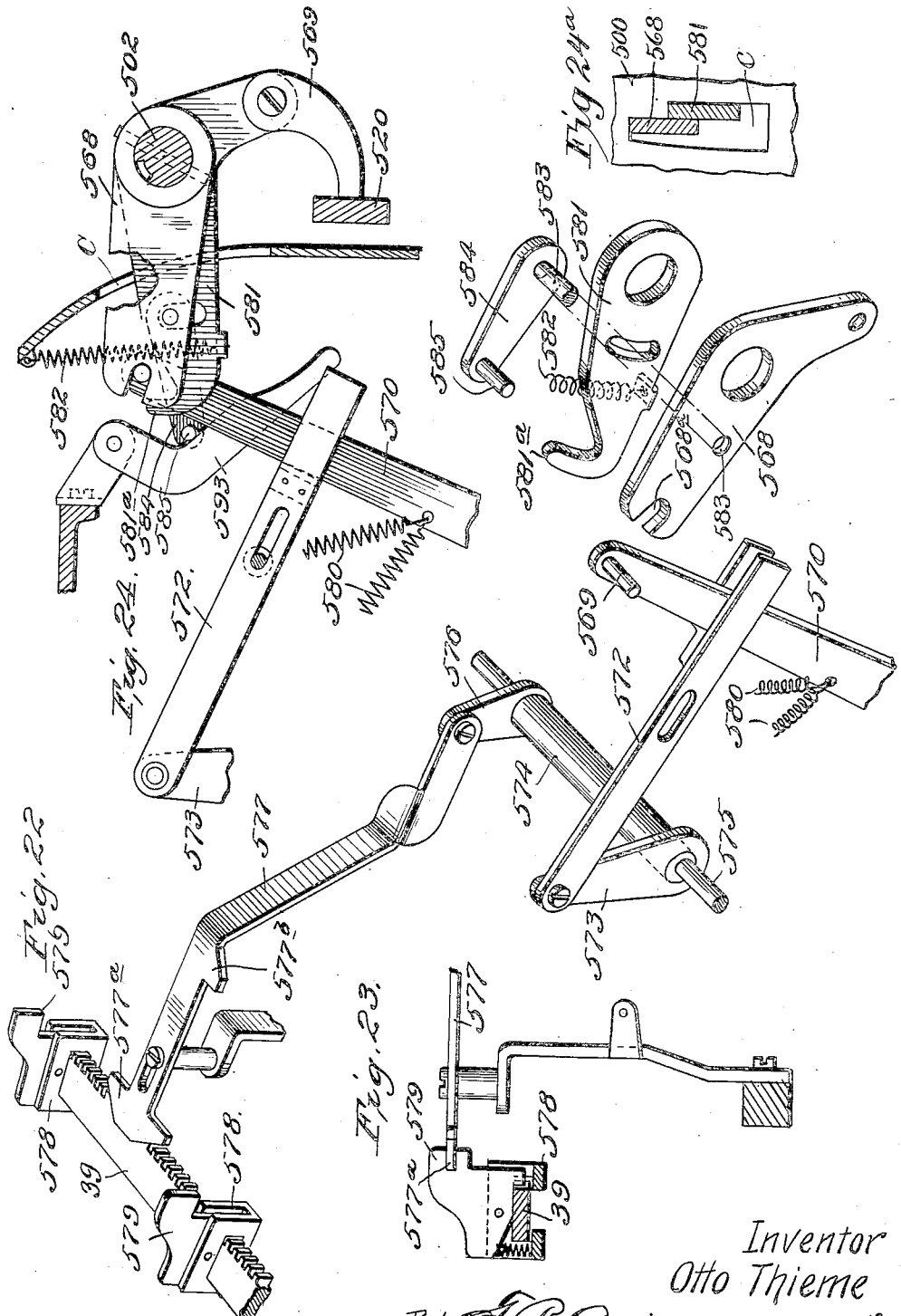

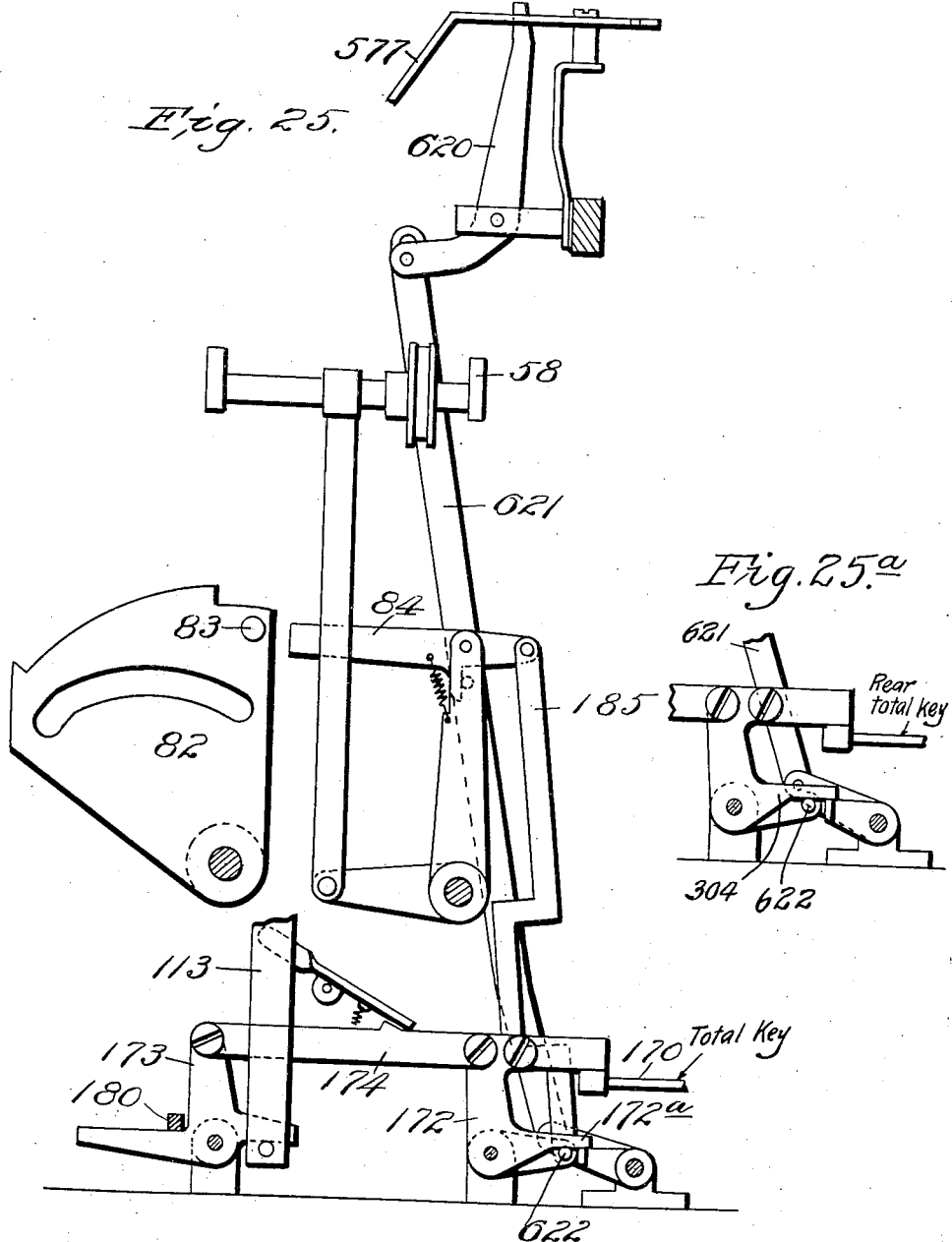

O. THIEME.
TALLY ROLL ATTACHMENT FOR CALCULATING MACHINES.
APPLICATION FILED MAY 20, 1916.
1,288,288.
Patented Dec. 17, 1918.
15 SHEETS—SHEET 14.
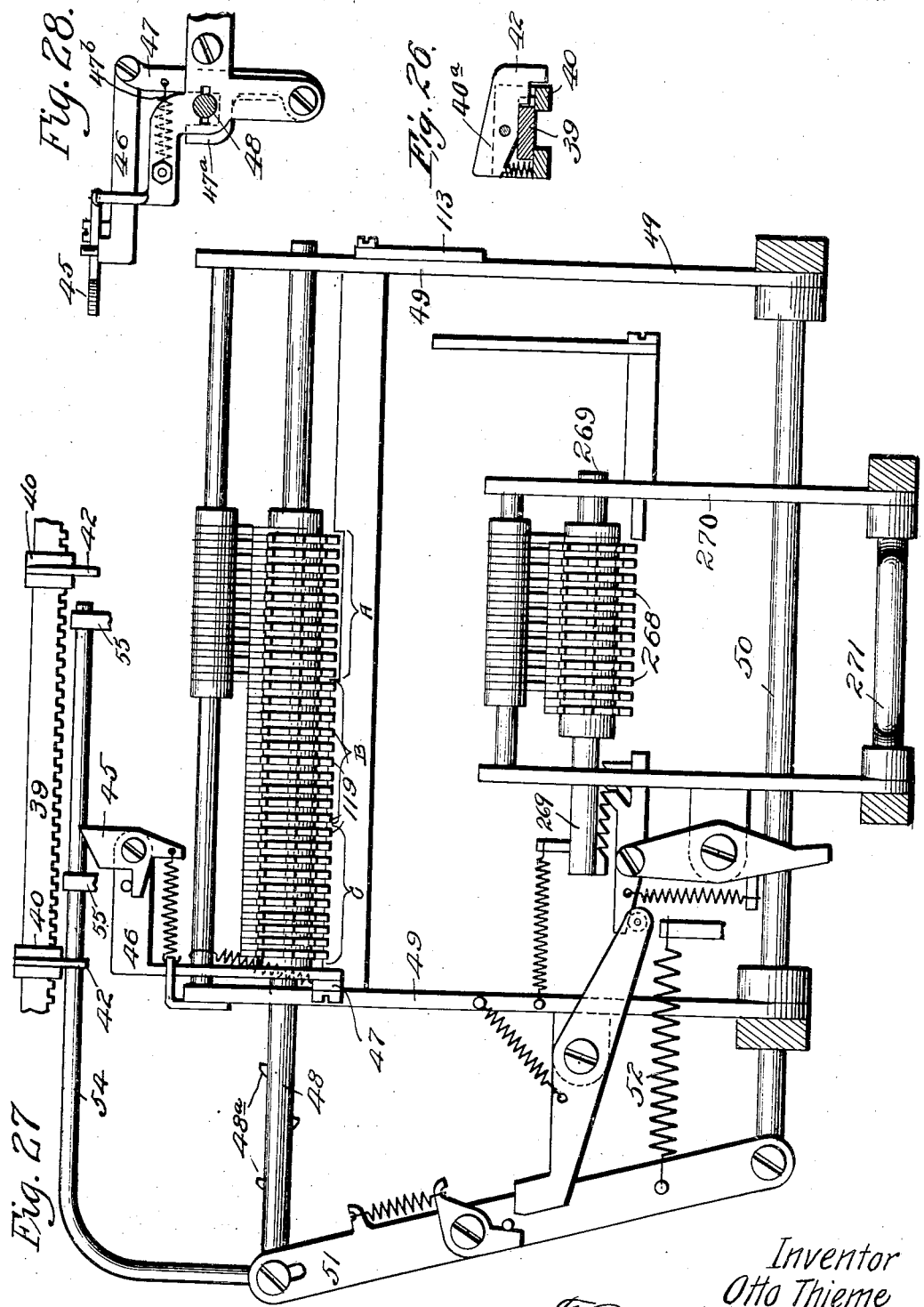
Inventor
Otto Thieme
By J. R. Cornwall Atty

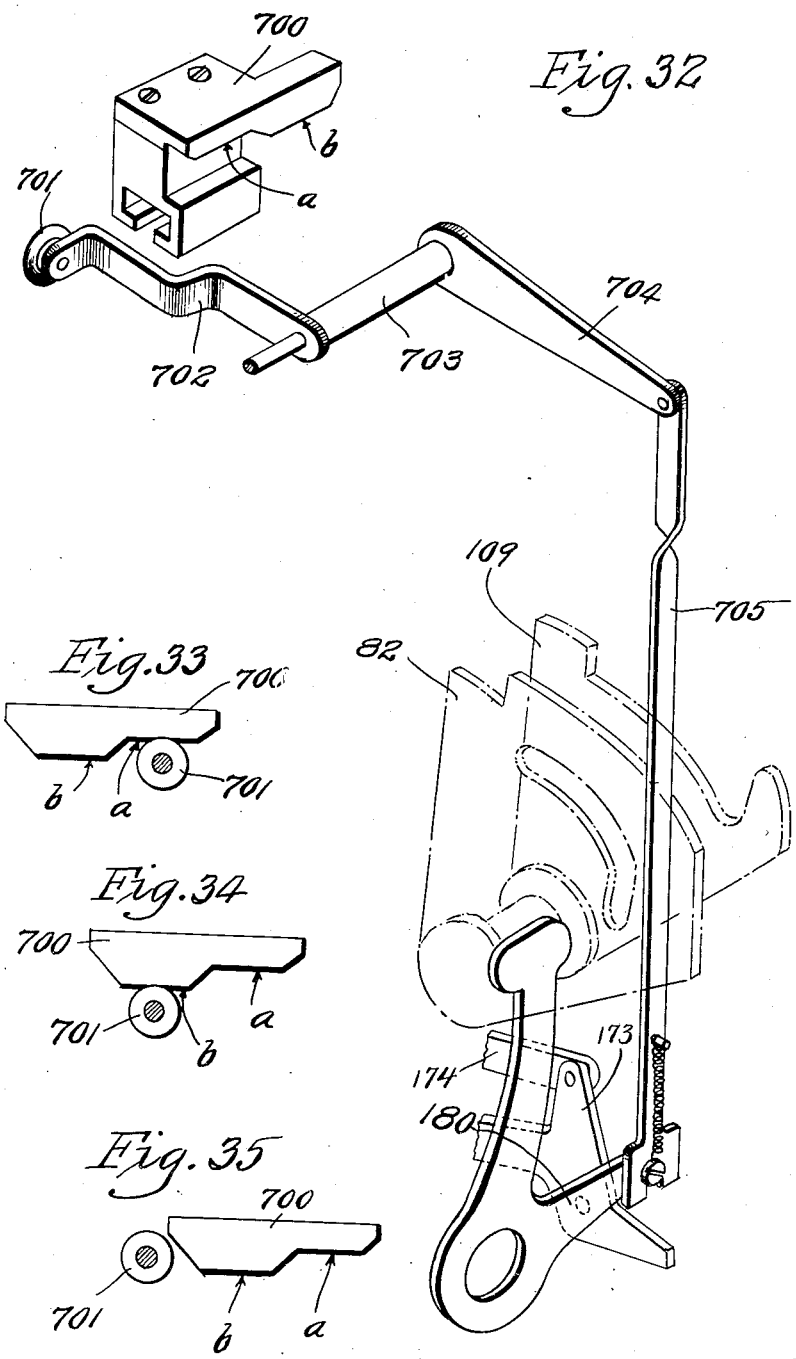

UNITED STATES PATENT OFFICE.

OTTO THIEME, OF ST. LOUIS, MISSOURI, ASSIGNOR TO MOON-HOPKINS BILLING MACHINE COMPANY, OF ST. LOUIS, MISSOURI, A CORPORATION OF MISSOURI.

TALLY-ROLL ATTACHMENT FOR CALCULATING-MACHINES.

1,288,288.   Specification of Letters Patent.   Patented Dec. 17, 1918.

Application filed May 20, 1916. Serial No. 98,853.

*To all whom it may concern:*

Be it known that I, OTTO THIEME, a citizen of the United States, residing at the city of St. Louis, State of Missouri, have invented a certain new and useful Improvement in Tally-Roll Attachments for Calculating-Machines, of which the following is a full, clear, and exact description, such as will enable others skilled in the art to which it appertains to make and use the same, reference being had to the accompanying drawings, forming part of this specification, in which—

Figure 1 is a side elevational view of a combined adding and typewriting machine showing my improved tally-roll attachment arranged thereon.

Fig. 2 is a top plan view of said machine.

Fig. 3 is a side elevational view partly in section through the rear portion of the machine, showing my improved tally-roll attachment in position thereon.

Fig. 4 is a vertical sectional view through the upper rear portion of the machine and through the tally roll attachment.

Fig. 4ª is a plan view of the key bar arrangement of the adding mechanism in which I have shown also multiplier keys and their connections.

Fig. 4ᵇ is a side elevational view of the rear ends of the digit key bars of the adding mechanism.

Fig. 5 is a top plan view of certain of the parts shown in Fig. 4.

Fig. 6 is a top plan view showing the ribbon reversing mechanism.

Fig. 7 is a rear elevational view of said ribbon reversing mechanism.

Fig. 8 is a rear elevational view of part of the tally-roll carriage showing the tabulating bar.

Fig. 9 is a detail view showing the mechanism for tabulating the tally-roll from the laterally movable paper carriage.

Fig. 10 is a detail view of one of the adjustable blocks carried by the paper carriage.

Fig. 11 is a detail view showing the escapement pawls for the tally-roll carriage.

Fig. 12 is a detail view of the tally-roll carriage return mechanism which is operated by an adjustable block on the main paper carriage.

Fig. 13 is a detail view of the adjustable block mounted on the main paper carriage.

Fig. 14 is a side elevational view of the tally-roll return mechanism.

Fig. 15 is a detail view of the clutch employed in connection with the tally-roll return mechanism.

Fig. 16 is a sectional view on line 16—16 of Fig. 15.

Fig. 17 is a side elevational view showing part of the ribbon feeding mechanism.

Fig. 18 is a similar view showing the ribbon carrier.

Fig. 19 is a detail sectional view of the ribbon carrier shown in Fig. 18.

Fig. 20 is a side elevational view of part of the paper feeding mechanism.

Fig. 21 is a detail view of the type guards and their controlling devices.

Fig. 22 is a detail view showing the manner of controlling the printing mechanism of the tally-roll from the main paper carriage.

Fig. 23 is a detail view partly in section of the adjustable block mounted on the main paper carriage.

Fig. 24 is a side elevational view illustrating the manner of controlling the printing mechanism of the tally-roll.

Fig. 24ª is a detail view of a portion of the rear wall of the casing.

Fig. 25 is a diagrammatic view of a modified form of control for the tally-roll as operated by the total key.

Fig. 25ª is a similar view showing the manner of control of the tally-roll as operated by the rear total key.

Fig. 26 is a detail view of the adjustable block on the typewriter carriage for controlling the forward totalizers.

Fig. 27 is a plan view of the front and rear registers illustrating the carriage control thereof.

Fig. 28 is a side elevational view of the escapement mechanism for controlling the front registers.

Fig. 29 is a detail view of one of the actuating racks showing its relation to two sets of totalizers and two separate printing devices.

Fig. 30 is a view showing the separated relation of the tripping blocks on the laterally movable typewriter carriage.

Fig. 31 is a side elevational view showing said tripping blocks assembled.

Figs. 32 to 35 are details of a non-add mechanism.

This invention relates to a new and useful improvement in tally-roll attachments for calculating machines, the object being to provide a plurality of means whereby comprehensive statements of various transactions and operations performed by the machine may be recorded on different sheets or strips of paper. For instance, in the making up of statements for country banks, or customers, whether daily or monthly, it is the practice to distribute various items constituting said statements in different columns where they may be checked over by the bank and its customers. The statement is usually sent to the customer. It is desirable that, at the time of preparing these statements to be issued to the customers, the bank retain a record thereof for its own use in order that at the end of the day or whatever period is covered by the issued statements, the bank will have a complete record of the issued statements for purposes of re-checking and correcting errors in the issued statements should any be found to exist.

To illustrate a customer's statement:

| Date. | Checks. | Date. | Checks. | Date. | Deposits. |
|---|---|---|---|---|---|
| | | | | Bal. for | 271.56 |
| March 1 | 25.00 | March 10 | 250.00 | March 1 | 500.00 |
| 3 | 75.00 | 13 | 350.00 | 5 | 300.00 |
| 5 | 100.00 | 18 | 200.00 | 15 | 650.00 |
| 7 | 250.00 | 23 | 100.00 | 25 | 86.00 |
| | 450.00 | | 900.00 | Footing | 1,807.56 |
| | | | | Checks returned | 1,350.00 |
| | | | | Bal. March 31 | 457.56 |
| | | | | Total | 1,807.56 |

This statement is made up in the usual way on the regular slips issued by the bank at the time the customer's book is balanced and shows two or more columns, the dates and amounts checked out on the said dates, the old balance, or balance forwarded, the amount of deposits, the total of checks returned, the balance on the day the statement was issued, and total of the old balance plus the deposits which equal the new balance as determined by subtracting the checks returned from the total of the old balance and deposits.

The tally-roll in the present machine is designed only to show the figures printed by the adding mechanism or the various totals, and for the purpose of identification, the operator should indicate the customer's number, at the top of the statement, which number is, of course, not added in the accumulators. To illustrate the use of the tally-roll attachment in sending out daily statements to country banks, the following may be given as an example:

| Old bal. | Deposits. | Checked out. | Exchange. | New balance. |
|---|---|---|---|---|
| 1,234.50 | 3,500.00 | 3,675.00 | 4.50 | 1,055.00 |
| 1,075.00 | 6,000.00 | 5,000.00 | 6.00 | 2,069.00 |
| 2,546.00 | 100.00 | 1,900.00 | .50 | 745.50 |
| 4,855.50 | 9,600.00 | 10,575.00 | 11.00 | 3,869.00 |

In some instances, in making up bank statements, it is desirable, for checking purposes to record each item comprising the totals of the different columns, and these may be obtained by the use of the adjustable blocks to be hereinafter described. In other instances, it is desirable only to obtain the totals of the various columns appearing in the statement to be issued, in which event such totals may be controlled by the several total keys of the machine, the adjustable blocks on the main paper carriage being moved to one side, or entirely removed, if this latter operation is desired.

In the drawings I have shown a combined typewriting and adding machine such as is disclosed in French Patent No. 383,719, dated January 16, 1908, and which is also shown in application for United States Letters Patent filed by Hubert Hopkins, Serial No. 310,739, filed April 9, 1906, to which my tally-roll attachment is applied; but it is obvious that the principles of operation hereinafter described and the mechanism for carrying the same into effect may be utilized with other types of machines.

In the following description, I shall utilize, as far as practicable, the same reference numerals which are applied in said French patent to refer to corresponding parts. I will state, however, that in the present machine the multiplying mechanism and associate parts have been omitted, but the wheels 268, which form the product wheels in multiplying operations of the mechanism disclosed in the French patent, have been retained. In the present machine they are only used as adding wheels. However, the multiplying mechanism may be retained if desired.

*Typewriter mechanism.*

The typewriter mechanism consists of the usual key-board comprising keys and a key-bar 1. 2 is the spacing key which with the keys and bars 1, operates the universal bar 3 whereby the carriage 4 carrying the platen 5 is letter spaced leftwardly at each operation of the universal bar. The usual escapement mechanism of the carriage and paper feeding mechanism, ribbon feeding mechanism, etc., may be employed in connection with what I may term the main paper carriage of the machine, and whose function is to support a sheet of paper on which itemized statements may be made. These statements may contain words and figures as printed by the typewriting mechanism in the usual way and as fully described in said French patent, and on the sheet of paper carried by the platen 5 are recorded the items and totals thereof registered in or yielded from the accumulating devices of the adding mechanism. The main paper carriage, above described, has mounted thereon and movable therewith a notched rack 39 on which notched rack are adjustably mounted various stops, to be hereinafter described, for controlling different parts of mechanisms of the adding department of the machine. Preferably there is provided tabulating mechanism for this main paper carriage, means for operating the escapement of said carriage to letter space the same when a digit key in the adding department is operated, means for preventing lateral movement of the carriage when a digit key of the adding department is operated so that the adding department may record various items in column order, means for line spacing the platen of this carriage upon the operation of the adding mechanism, etc., all of which are described in said French patent, before referred to, and therefore need not be specifically described here.

*Controlling the position of the forward totalizers from the typewriter carriage.*

On the notched bar 39 is a series of adjustable blocks 40 (see Fig. 27) which blocks are substantially U-shape so as to provide a support for a pivoted locking member 40ª (see Fig. 26) having its forward end extending above the block 40 so that the same may be rocked on its pivot to disengage the shouldered rear end of said pivoted member from the notches in the bar. In this way, the block and its pivoted member may be adjusted along the bar; then, when the pivoted member is released said block will become locked in position on the bar. For a detailed description of this form of adjustable block, see Patent No. 1,024,295, granted to me April 23, 1912. The rear end 42 of the pivoted member 40ª is designed to coöperate with a tappet 45 mounted on a sliding bar 46 connected at its rear end to an escapement lever 47, which latter, when vibrated, permits the forward totalizers to move from left to right. (See Figs. 27 and 28.)

48 is the shaft on which the forward totalizers 119 are mounted, said shaft finding bearings in two frame plates 49 pivoted at their rear ends on a shaft 50. The totalizer wheels are separated into three groups, indicated by A., B., and C. in Fig. 27. 51 indicates a lever which may be pivoted to the end of shaft 50, the free end of said lever being connected to the end of shaft 48. A spring 52 tends to draw the lever 51 toward the left looking from the front of the machine (or toward the right, as shown in Fig. 27, looking from the rear of the machine), and consequently whenever the lever 47 is vibrated its escapement tooth 47ª and the shank of the lever 47 will coöperate with projections 48ª on rod 48 and permit said rod and its carried totalizer wheels to move under the action of spring 52. Thus, if the typewriter carriage is moving toward the left and one of the projections 42 should strike the inclined face of the tappet 45, the bar 46 would be forced rearwardly, throwing the tooth 47ª in the path of the pin 48ª on shaft 48, the release of the tappet causing the escapement lever 47 to move forwardly under the impelling action of a spring 47ᵇ connected therewith, so as to cause the shank of the lever 47 to be located in the path of the next projection 48ª on the rear side of shaft 48. In this position of shaft 48 the left group A of totalizer wheels will be displaced with respect to their actuators and the middle group, B, of totalizer wheels will be placed in position with respect to said actuating devices. If, now, the next block 40, in the continued step-by-step movement of the typewriter carriage to the left, should have its projection 42 strike the inclined face of the tappet 45, the escapement bar 47 would again be vibrated so as to permit spring 52 to move the middle group of totalizer wheels out of position with respect to the actuators and place the right-hand group C of totalizer wheels in position with respect to said actuating devices. Thus by means of the blocks 40 and their carried parts, it will be obvious that the bar 47 may be vibrated in different positions of the typewriter carriage, depending upon the adjusted position of the blocks 40.

As it is necessary to restore the groups of totalizer wheels to their initial position when the typewriter carriage is restored, means are provided for accomplishing this, which means consist of a block 553 (Figs. 12 and 13) similar, so far as its adjustable feature is concerned, to the blocks 40 except that the block 553 is not provided with a pivotal projecting tooth 42. Block 553, however, is provided with a downward extension, see Fig. 12, which downward extension coöperates with the end of a rod 54 mounted in suitable guides 55 secured to the top frame plate of the typewriting machine. This rod 54 is connected at its end to the shaft 48 and consequently when the typewriter carriage is moved from left to right the downward extension on block 553 engages the rod 54 and moves the totalizers to their position at the right.

As the typewriter carriage travels from right to left the blocks 40 will coöperate with the tappet and properly position the left-hand, middle or right-hand group of totalizer wheels in operative relation to their actuating devices. If it is desired not to position the forward groups of totalizers upon the movement of the typewriter carriage, it is obvious that both blocks 40 could be moved to the extreme left-hand end of the scale bar 39, so that they would not coöperate with the tappet 45 in the movement of the typewriter carriage.

*Setting up devices.*

The setting up devices comprise a series of bars, A', Figs. 4ª and 4ᵇ, which are operated by the digit keys constituting group *a* (Fig. 2) which bars, as in the French patent, terminate under the lower ends of vertically movable bars 56 (Fig. 3). The upper ends of these bars 56 are disposed in a longitudinal row and located under the setting up pins 63 in a transversely movable carriage 58. These pins in the traveling carriage are designed to transfer the number represented therein to the stop pins 93 in the stationary field of stops (see Fig. 4), which stop pins 93 control the excursions of the racks 100, in the manner described in said French patent.

*Accumulating numbers in the totalizers.*

The front totalizer wheels are indicated at 119 and the rear totalizer wheels are indicated at 268. In the ordinary operation of the machine, when a number is set up on the digit keys and the motor key depressed, (for a detailed description of the motor and its connections, see Hubert Hopkins' Patent No. 1,025,698, dated May 7, 1912), the number will be introduced into one of the groups of forward totalizer wheels, the group so receiving the number being determined, ordinarily, by the position of blocks 40 on the typewriter carriage. However, if it is desired to set up numbers in the rear totalizer wheels 268, the key marked "R. Reg" (Fig. 2) is depressed, after the number is set up on the key board, and the motor key depressed to introduce said number into the rear totalizer, as fully described in United States Letters Patent, No. 1,143,241, granted to me June 15, 1915. The carrying mechanism shown in Fig. 4 is slightly different from that disclosed in the French patent and while it operates upon the same general principles, and is controlled in the same general way as the carrying mechanism disclosed in the French patent, I will briefly describe the differences here.

In introducing a number into either set of wheels 119 or 268, the racks 100 first move forwardly until arrested by the stop pins 93. The selected group of totalizer wheels (119 or 268) is now moved into engagement with the racks which, upon their return movement, roll the number thereinto. If any register wheel is caused to pass from 9 to zero, a tripping projection 120 thereon will operate an independent pawl 121 mounted on a shaft 122. This pawl has a projection 121ª which engages a depending member 123 of a bell crank lever 124 mounted on a shaft 125. In the French patent this lever 124 lifted a latch bar and thereby permitted the carrying segment 129 to move forwardly the distance of one tooth; but in my present construction, the operation of the bell crank, whose rearwardly extending member is provided with a shoulder 124ª in engagement with a projection 129ª on the carrying segment, will directly release the carrying segment and permit its forward movement. By this construction, I avoid the use of the separate latch bars of the French patent and thus reduce the number of parts in the carrying mechanism. With respect to restoring the carrying segments, etc., the operation of the carrying mechanism, herein disclosed is the same as that illustrated and described in said French patent.

With the exception of the carrying mechanism, just above described, we may assume that, in the main, the typewriting mechanism and the adding mechanism of the machine illustrated in the accompanying drawings is the same, to all intents and purposes, as that illustrated and described in said French patent, and the United States patents hereinabove referred to.

*Tally-roll frame.*

Referring now to Figs. 1, 3, 4, and 5, it will be observed that the casing 500, which incloses the rear end of the machine, has two brackets 501 mounted thereon which brackets extend rearwardly and provide supports for a grooved shaft 502. 503 indicates the frame consisting of two side arms which are provided with bearings so that said frame may slide longitudinally the shaft 502, and a cross arm on whose upper edge is secured a serrated plate 504 forming a tearing edge for the tally strip and on the inner face of which cross arm is mounted a platen 505 of rubber or other suitable material. This frame 503 forms a support for the paper guides 506 and 507 and also a mount for the paper feed rolls 508 and 509, the former of which is preferably idle. 510 is a cross bar connecting the lower legs of the frame to which is secured a plate 511 operating in the groove of shaft 502, said plate having some play in said groove so as to provide lost motion, the purpose of which will hereinafter be described. 512 indicates a frame having upward extensions bent to embrace the shaft 502, said extensions being located within and adjacent the legs of the frame 503 so that the frame 512 will be moved in all positions of the frame 503. Frame 512 has side members 513 preferably bent outwardly therefrom, the upper ends of which side members provide a support for a guide roller 514 for the paper and the lower ends of which side members provide a mount for the spool 515 which carries the roll of paper 516 from which the tally strip 600 is fed. 517 indicates a bail mounted on the frame 512 and held against the tally strip by means of a torsion spring 518, the purpose of this being to exert a braking action upon the tally strip so as to keep it taut as it is being unwound from its supply roll. An inward extension on each side frame 513 carries a roller 519 which bears upon a track plate 520 secured to the rear wall of the casing of the machine and extending parallel to the rear wall thereof and entirely across said rear wall, as shown. The frame 503 carries an escapement rack 521 below the shaft 502 on which escapement rack is a depending portion carrying a roller 522 which bears on the outer face of track plate 520, (see Figs. 3 and 8). By means of this roller 522, the upper end of frame 503 is permitted to move forwardly so that its platen 505 can make a printing impression, such forward movement of frame 503 not disturbing the frame 512; and likewise the lower end of frame 512 is permitted to move outwardly slightly if for any cause the tension on the tally strip is such as to require such movement. This outward movement of the lower end of frame 512 is also desirable in introducing a new roll of tally paper.

In order to hold the frame 503 in the position shown in full lines in Fig. 4, I pivotally mount a bar 523 on the lower edge of the track rail 520, the upper end of which bar carries a roller 524 which bears against the outer face of the escapement bar 521 so as to normally hold said bar and frame 503 which carries it in the full line position shown in Fig. 4. The spring 525 connected to the rod 523 at all times holds the roller against the escapement bar and tends to move the same inwardly so the said bar and frame will occupy their normal positions.

*Tally roll frame escapement.*

Reference has been made heretofore to the printing of different numbers on the sheet of paper carried by the main paper carriage in column order and horizontal alinement, which numbers, as the typewriter carriage is advanced leftwardly, through the medium of the adjustable blocks 40, causes certain of said numbers, in at least three of the columns, (or such number of separate accumulators as may be arranged upon the shaft 48) to be separately accumulated.

Assuming now that it is desirable to make a record on the tally strip of the different items constituting the three columns registered and accumulated in the groups of forward totalizer wheels 119, (or the totals thereof) it follows that, as the typewriter carriage advances leftwardly, and, through the blocks 40 carried thereby, operates the escapement so as to successively bring the groups of totalizer wheels A, B, and C (Fig. 27) under control of the racks 100, the tally roll carriage, whose starting or home position, like the typewriter carriage, is at the right of the machine, looking from the front, will have to be stepped leftwardly so as to present different printing surfaces of the tally-roll to the recording mechanism so that the tally-roll will have corresponding columns of figures or totals thereof impressed thereon. The frame 103, before referred to, has a spring 526 (see Fig. 8) connected thereto, the other end of the spring being connected to one of the brackets 501 so that the energy of said spring is at all times exerted to draw the frame 503 leftwardly.

The escapement bar 521, carried by the frame 503, is provided with a series of recesses 521$^a$ and projections 521$^b$ located according to the desired stepping movement of the frame with which recesses and projections coöperates an escapement pawl 527 (see Fig. 9) in the form of a bell crank lever, said escapement pawl being pivoted to a bracket 530 extending inwardly from the track rail 520. This track rail is cut away or recessed to permit the operation of the escapement pawl. The escapement pawl has a leaf spring member 527$^a$ secured thereto and whose free rear end coöperates with the projections 521$^b$ on the escapement rail, the purpose of this spring 527$^a$ being to absorb the shock of the tally-roll carriage.

531 represents a bar slotted at each end to engage screws which find a bearing in some suitable frame members of the machine, (see Fig. 5) whereby through the medium of these guiding slots, the bar 531 may be moved rearwardly into engagement with the escapement pawl to depress the rear end of the same out of the path of its coöperating projection 521$^b$ on the escapement rail 521. Bar 531 is held forwardly by means of a spring 532. A tappet 533 is mounted upon the extreme forward end of the bar 531 to coöperate with adjustable blocks 534 mounted upon the notched rail 39 of the typewriter carriage. These blocks 534 have pivoted members 535 mounted therein similar to the pivoted members 42 of the blocks 40, except that the rear ends of these pivoted members 535 lie in a different horizontal plane (see Fig. 31). In this manner, the different stop blocks on the notched bar 39 may coöperate with their respective tappets without interference with other tappets. The front end of tappet 533 is beveled or inclined as shown in Fig. 9 so that as the typewriter carriage moves leftwardly, in the direction of the arrow, on bar 39, the members 535 will engage the inclined end of the tappet 533 and cam the same rearwardly. Upon the return movement of the typewriter carriage to the right, the tappet 533 swings on its pivot in a manner well known without vibrating the bar 531.

The location of tappet 533 relative to tappet 45 (preferably slightly to one side thereof as shown in Fig. 2) is such that when the shaft 48 carrying the group of totalizer wheels 119 is being stepped leftwardly, the tally-roll frame will be stepped leftwardly practically at the same time, its tappet 533 being operated shortly after the operation of the tappet 45; and both the tappets 45 and 533 are preferably operated during the tabulation movement of the typewriter carriage from one column position to another so that each of the tappets will be engaged, moved rearwardly, and restored to its normal forward position before the typewriter carriage completes its tabulation movement. This is essential because if either of the adjustable blocks 40, or 534, was so positioned as to engage and hold its respective tappet rearwardly at a time when the typewriter carriage was stationary, the escapement pawls controlled thereby would effect an incomplete operation, which is undesirable.

*Returning the tally-roll carriage.*

In United States Patent No. 1,120,862, granted December 15, 1914, upon an application for improvements in carriage return mechanism filed by me, I have shown a construction for returning the typewriter carriage from a constantly rotating motor shaft, this carriage return mechanism being rendered effective by the depression of what is known as a carriage return key. In the drawings, (see Figs. 5 and 15) 535' is a constantly running shaft driven from the motor drive of the machine, the upper end of which shaft is flattened as shown in Fig. 15 for engagement with a clutch carrying member 536 held normally against upward movement by a plate 537. 538 is the companion clutch member carried on the lower end of the normally idle shaft 539, which shaft is mounted in a flexible bearing 540 seated in the stationary framing of the machine, (see Fig. 16). This flexible bearing 540 is held in position by a leaf spring 541, the bearing being inserted through suitable lateral openings in the framing of the machine so as to enable the upper end of the driven shaft to yield slightly, as will presently be described. The upper end of the driven shaft 539 (see Fig. 5) carries a gear wheel 542 which is designed to mesh with rack teeth 543 formed on the inner face of the escapement bar 521. The carriage return mechanism, including the gear wheel 542, is mounted in the frame of the machine, while the escapement bar, having the rack teeth which mesh therewith, is carried by the tally-roll frame which is slidingly mounted on the casing of the machine. This casing is removable and when the parts are assembled, if the teeth on gear 542 do not mesh exactly with the rack teeth 543, then the shaft 540 may yield slightly until, by a relative movement between the teeth, they are brought into proper mesh with each other; likewise, the escapement bar 521 and the lower end of frame 503 may yield outwardly slightly for the same purpose.

As shown in Fig. 15, it will be observed that the bracket in which the shaft 539 is mounted, has a knife edge bearing at its lower portion which permits a rocking movement of the shaft, the upper end of said shaft finding bearing in the yielding block 540. The opening in the bracket above the knife edge bearing is made slightly larger than the shaft 539 to permit this movement. A set screw 540$^a$ is employed at the back of the yielding block 540 which set screw, in conjunction with the jam nut mounted thereon, enables the upper end of shaft 539 and the gear wheel 542 to be adjusted toward and from the teeth on the escapement bar 521. The clutch bearing member 536 has an annular groove at its lower end in which are received the members of a plate 544 which plate is held upwardly by means of a spring 545. A post 546 mounted in a vertical bearing in the fixed frame bracket has its upper end located under a pin 547 carried by a rock arm 548 pivotally connected to the track plate 520 (see Fig. 8).

The escapement bar 521 has a cam face 521$^c$ at one end thereof which is designed to engage the pin 547 and depress the plate 544 and the clutch carrying member engaged thereby when the tally-roll carriage moves, or is moved, by the carriage return mechanism to its extreme right-hand position. This cam face 521$^c$, however, is so located with respect to the first notch and shoulder (521$^a$ and 521$^b$) of the escapement bar that the momentum of the carriage is relied upon to cause the cam face 521$^c$ to depress the pin 547, to disengage the clutch members, whereupon the spring 526, connected to the tally-roll carriage asserts itself and causes the tally-roll carriage to move leftwardly, to a slight extent, until the cam face 521$^c$ has disengaged from the pin 547 and the shoulder 521$^b$ is brought into engagement with the spring element 527$^a$ of the escapement pawl for the tally-roll carriage.

When the plate 544 has thus been temporarily depressed by the rocking of the arm 548, as above described, (and the tally-roll carriage is at its starting position at the right), the clutch members are held separated by means of a lever 549 (see Figs. 12 and 14) which lever is pivotally mounted on a frame portion of the machine and has a shoulder on its lower end to engage over and hold the plate 544 depressed. The engaging position of the lever with respect to the plate 544 is effected by means of a spring 550. The upper end of lever 549 lies immediately to the rear of the sliding plate 551 having guiding slots formed therein, whereby the same may be supported by the framing of the machine and guided in its movement—screws being employed to pass through the slots to hold and guide the bar 551, (see Fig. 8). The forward end of bar 551 carries a tappet 552 which tappet is provided with an inclined or cam face at its forward edge, similar to the tappets 45 and 533, heretofore described, with this difference, however, that the tappet 552 is so constructed that as the typewriter carriage travels leftwardly it will not operate the bar 551. It is only when the typewriter carriage travels toward the right that the bar 551 is operated.

The notched bar 39, before described, is provided with an adjustable block 553 having a cam face projection 554 (see Figs. 2 and 30), which, in the movement of the typewriter carriage, is designed at the proper moment to operate the bar 551, release the plate 544 and permit upward movement thereof to effect an engagement between the clutch members of the carriage return mechanism. When the carriage reaches its extreme position at the right, the cam face 521$^c$ will depress the pin 547 and with it, the plate 544 and disengage the clutch members. This position of the tally-roll carriage is abnormal, as before stated, and when the clutch members are disengaged, the spring 526 will move the carriage leftwardly a short distance until the escapement pawl is engaged by a shoulder 521$^b$ in which position of the tally-roll carriage, the cam face 521$^c$ is disengaged from the pin 547. The return mechanism for the tally-roll carriage, above described, is rendered effective by the position of the typewriter carriage and the adjustable block 553 thereon, the clutch members of said return mechanism being disengaged by the cam face 521$^c$. This carriage return mechanism for the tally-roll carriage is separate and distinct from the carriage return mechanism for the typewriter carriage, which latter may be of the construction shown in United States Patent No. 1,120,862, granted to me December 15, 1914, though it derives motion for its constantly driven shaft 535' from the same source of power, to wit, the motor drive for the calculating machine; the constantly driven shaft 535' (see Figs. 3 and 5) has a miter gear 557' at its lower end which meshes with a companion gear 556 on shaft 557 whose forward end is driven by the gears 558 which are in turn driven from the motor.

*Tally-roll recording mechanism.*

Referring now to Fig. 4, it will be observed that each of the rack bars 100 has a toothed extension 100$^a$ secured to the rear end thereof, for engagement with the segment 560, there being a segment and its connected type carrying part 561 for each rack. 562 are type carried by the type carrying part, said type being riveted or otherwise fixedly secured in position. These type carrying parts have characters, zero, 1, 2, 3, 4, etc., up to 9, in the usual order.

The shaft 271, (see Figs. 4 and 27) on which the side frames 270 are pivoted, which side frames carry the shaft 269 on which the rear totalizer wheels 268 are mounted, is bent up at its middle portion, between its bearings, to permit the segmental racks 560 to pass thereunder. The hub of each segmental rack and type carrying part (560—561) is provided with a shoulder 563 with which coöperates a shoulder on a pivoted type guard carrying member 564. Springs 565 tend to hold the shoulders of these guard carrying members in position against their respective shoulders 563.

566 are thin flexible type guards whose forward ends normally lie over the zero type, in the printing line, and prevent said zero type from making a printing impression on the tally strip. However, whenever any printing segment 561 is operated by movement of its controlling rack 100, it will tilt the guard carrying member 564 forwardly and uncover the type positioned in the printing line. The tilting of this guard carrying member 564 forwardly by the actuated type carrying segment, will also operate the guard carrying segment 564 to the right thereof so as to uncover the zero printing type in the printing line. It will be seen by reference to Fig. 21, that each of the guard carrying members 564, except the one in the units column or order of lowest denomination, has a lateral projection 567 extending behind the next adjacent guard carrying member 564 identified with the column of next lowest order. Thus, when any guard carrying member of any order is operated, it will operate all of the other guard carrying members to the right, as seen from the front of the machine, or of lower order, to expose the zero type in the printing line. To illustrate, if $12.50 was set up on the key board and the racks 100 moved forwardly to introduce this number into the selected accumulator, the type carrying parts of the tally-roll printer would be correspondingly positioned to record this number, with the exception of the one identified with the rack of lowest order which would remain unmoved, but whose zero printing type would be exposed in the printing line so that the zero at the right would be printed. All of the type carrying parts of the tally-roll printer of higher denomination to the left of the highest digit in the number being recorded, will remain unmoved and consequently the guards 566 will cover the zero type to the left of the number being recorded and these zeros will not be printed.

The printing impression on the tally strip is made by rocking frame 503 so as to force its platen against the exposed type in the printing line. The tally strip is in front of the platen, as shown in Figs. 4, and the ink ribbon travels over the type in the printing line and under the free ends of the type guards. The method of effecting a printing impression, that is, forcing the tally strip against the type by means of the platen carried by the rocking frame 503, is as follows: The shaft 502, before described, has a groove on its upper side in which is received the lower end of a plate 511, there being slight lost motion of the plate in the groove so as to permit a slight freedom of play necessary in sliding the frame 503 along the shaft. This play or lost motion is also taken advantage of to effect the operation of the tally strip feed rolls as will presently appear.

At one end of the shaft 502 is fixed an arm 568 which arm has a stop block 569 on its outer end (see Fig. 24) for engagement with the track plate 520. This stop block determines the normal position of shaft 502 and is preferably made adjustable on the arm 568 so as to compensate for irregularity in manufacture. The rock arm 568 extends through an opening C in the rear wall of the casing shown at the left, Fig. 8 and is provided with a slot 568ª which, as shown in Fig. 3, is normally in position to receive a pin 569 on the upper end of a bar 570. The lower end of this bar 570 is connected to a cam plate 571, pivoted on the shaft 86 and having a cam slot formed therein for engagement with a stud or pin carried by the cam 266 which is mounted on shaft 81, which latter is the main operating shaft of the machine and is rocked at every operation of the machine. Thus, whenever the machine is operated, the initial movement of the pin on cam 266, passing through the concentric portion of the slot in cam 571, will maintain the bar 570 practically stationary to enable the digit type 562 to be moved to their printing position, after which and during the final movement of said cam the bar 570 will be depressed to make a printing impression on the tally strip. On the initial reverse movement of cam 266 the bar 570 will be lifted, and during the final movement of the cam, held stationary. The upper end of bar 570 is guided between the forked ends of a bar 572, (see Figs. 22 and 24) which is slotted to receive a screw, whereby the same is variably fulcrumed on the side framing of the machine. This bar 572 is pivotally connected to a rock arm 573 fixed on one end of the sleeve 574 mounted on a cross shaft 575. The opposite end of this sleeve carries a rock arm 576 to which is connected the rear end of a bar 577 whose front end is slotted to receive a screw secured to a bracket on the frame of the machine whereby the front end of said bar is held in position and guided in its movement.

578 indicates blocks adjustably mounted on the notched bar 39 of the typewriter carriage, said blocks having pivoted members 579 whose rear faces are adapted to coöperate with the inclined ends of a T-shaped head 577ª on the forward end of bar 577. It will be observed that there is a straight face between the inclined ends of this T-shaped head. This is to insure proper engagement of the adjustable blocks therewith at the end of each tabulating movement of the tally-roll carriage. Unlike the tappets 45, 533, and 552, heretofore described, the bar 577 is not designed to be momentarily vibrated and then returned to its normal position. On the contrary, the blocks 578 are so adjusted that when the tally-roll carriage is in its home position, and at the end of each tabulating movement thereof, the bar 577 shall be held in its rearward position. Whenever the bar 577 is forward, the printing mechanism for the tally strip is disabled and thus by the adjustment of blocks 578, this disablement can be effected in any position that the typewriter carriage may occupy, that is, a stationary position wherein other parts of the machine may be operated.

The upper end of bar 570 is held within the forked end of the lever 572 by means of springs 580, (see Fig. 22). These springs also tend to move the bar 577 forwardly.

When the bar 577 is moved rearwardly, the pin 569 is moved into the slot 568ª and thus bar 570 is connected to the rock arm 568 and at each operation of the machine the shaft 502 will be rocked.

In order to prevent the pin 569 from slipping out of its slot, I provide a guard member 581 which is loosely mounted on shaft 502 and which has a finger 581ª at its forward end normally located in front of and below the plane of the pin 569. Thus, when the parts are in normal position, the finger uncovers the slot. A spring 582 tends to hold the guard member 581 upwardly at all times. 583 indicates a post carried by the rock arm 568 which post passes through a curved slot in the guard member 581 and carries at its outer end an arm 584 provided with a pin 585, which latter operates the ribbon feeding mechanism of the tally-roll attachment, as will hereinafter appear.

The rear wall of the machine forms a stop for the guard member 581 holding it normally in the position shown in Fig. 24ª in which the post 583 is located in the upper end of the curved slot thereof, while the guard member 581 is depressed. However, when the rock arm 568 is depressed, this post will traverse the slot and eventually contact with the bottom wall thereof, whereupon the guard member will be depressed with the rocking arm and the operation of the ribbon feeding mechanism effected. The depression of rock arm 568 will cause the finger 581$^a$ to close the end of slot 568$^a$ and prevent any displacement of the pin 569. In the rocking of the arm 568, the walls of the slot will, in the lowermost position of said rocking movement, be inclined downwardly and the pin would have a tendency to ride down this incline and out of the slot were it not prevented from doing so by the presence of a guard finger 561$^a$.

When the rock arm 568 is depressed to rock the shaft 502, the platen carried by the frame 503, is brought into contact with the type in the printing line, but the pressure necessary for effecting the printing impression is not exerted upon said platen until the lost motion between the plate 511 and slot in the shaft 502 is taken up. When this lost motion has been overcome, the final pressure is placed upon the platen, this occurring at the last operation of the downward movement of the rock arm 568.

When the rock arm 568 is lifted, it is immaterial whether the frame 503 is first restored to its normal position or whether the lost motion of the plate in the groove is first taken up. In any event, the normally retracted position of the frame is determined by the roller 522 carried by the escapement bar (see Figs. 1 and 8). When the roller 522 contacts with the track plate 520 and arrests the frame 503 in its retracted position, the shaft 502 continues to be rocked, thereby absorbing the lost motion referred to until the stop member 569 engages the track plate 520. This continued rocking movement of the shaft 502 is utilized in line spacing the tally strip.

*Line spacing the tally strip.*

One end of the paper feed roll 509 (the right-hand end, as viewed from the front of the machine see Fig. 2,) is provided with a hand-wheel 586 for manual operation. The opposite end of said feed roll is provided with a ratchet wheel 587, see also Fig. 20. This ratchet wheel coöperates with a spring pressed centering pin 588 carried by an arm pivotally connected to the frame 503, which centering pin permits the manual rotation of the feed roller 509 in either direction.

To mechanically effect the line spacing of the paper, I mount a plate 589 (Fig. 20) on the shaft 502, said plate having a slot and pin connection with the frame 503, so as to permit independent movement thereof, and said plate also having a projection which fits into the groove of shaft 502, but not tightly, permitting a slight independent play of said plate. Plate 589 carries a paper feeding pawl 590 which is normally held in operative position by a spring 591. A bar 592 (Figs. 2 and 20) is mounted in a bearing provided by one of the brackets 501, said bar being adjustably held in position by means of a set screw 593. This bar is cut away at intervals, as at 592$^a$, so that whenever said bar is adjusted to locate one of its cut-away portions opposite, or in line with, the paper feeding pawl 590, (see Fig. 20) said paper feeding pawl is permitted to engage a ratchet wheel and line space the tally strip. When, however, the paper feeding pawl 590 rides upon the bar, as shown by dotted lines in Fig. 20, the vibration of the pawl 590 will be idle. Thus, after a printing impression, and after the frame 503 has been retracted the full measure of its retractive movement, the continued rocking of the shaft 502 in taking up lost motion therebetween and said frame, will rock the plate 589 and vibrate the paper feeding pawl 590. If the bar 592 is so adjusted as to have a recess in line with said paper feeding pawl, then the paper feeding pawl will engage, and by operating the ratchet wheel, line space the tally strip; but, if said paper feeding pawl is riding the bar, its vibration will be idle.

The bar 592 is sufficiently long (see Figs. 2 and 5) to hold the paper feeding pawl 590 in a disabled position throughout the entire travel of the tally roll carriage, except when it occupies that position which may be designated as the extreme left position, when, by the presence of the recess 592$^a$, line spacing will be effected. The bar 592 may have a second recess 592$^b$ cut on its opposite side, as shown in Fig. 5, so that by rotating the bar 592, line spacing of the tally strip can be effected at a point before the carriage reaches its extreme left position. Of course in using the recess 592$^b$ for effecting the line spacing feed of the tally strip at this point, the blocks should be adjusted accordingly, such as the carriage return block, etc., so as to properly articulate and harmonize the various devices which are controlled by the typewriter carriage.

*Feeding the tally roll ink ribbon.*

The pin 585 which is vibrated when the arm 568 is rocked, as before described, will, in its descent, strike a lever 593' pivoted at 594 to one of the frame bars of the machine and through extension 593$^a$ thereof rock a plate 595 through the means of a connecting link 596 (see Fig. 17). Plate 595 carries a spring pressed pawl 597 which coöperates with a ratchet 598 on a shaft 599 (see Fig. 6). Thus, whenever the frame 568 is rocked to effect a printing impression, the shaft 599 will be rotated a short distance to effect a feeding of the ink ribbon.

*Ribbon reverse mechanism.*

600 indicates the ink ribbon which, as shown in Fig. 6, is designed to be wound upon spools 601. Each of these spools has a miter gear 602 connected thereto with which miter gears 603 are designed to alternately engage, depending upon the direction of feed of the ribbon—the ribbon being taken up or wound upon the spool which is being driven. The shaft 599, before referred to, is of such length that when one of these gears 603 is in driving engagement with one spool, the other of said gears is out of driving engagement, and vice versa. Each of the ribbon spools 601 has a hollow core formed in part by a fixed curved wall 604, to which the ends of the ribbon may be secured, and a movable wall 605, the latter being pivoted at one end and connected to a spring 606 which tends to open said wall, as shown at the right in Fig. 6. The free end of this swinging wall carries a pin 607 which extends down through a curved slot in the bottom spool head. In the position of the parts shown in Fig. 6, the pin 607 has been permitted to move outwardly, into the path of a hook on the end of a sliding bar 608. Up to this time, the spool at the right-hand end, in Fig. 6, has been positively driven and exhaustion from the spool at the left-hand side of said figure has permitted the outward swinging of the removable wall and the location of the pin in front of the hook. The continued rotation of the left-hand spool in the direction of the arrow, by the drawing off of the ribbon, will cause the pin 607 to slide the bar 608 leftwardly, moving the pinion 603 out of driving engagement with the right-hand spool and the pinion 603, at the left, into engagement with the spool at the left. The spool at the left now becomes the driven spool and in winding up the ribbon thereon, its rotation will be reversed from that indicated by the arrow and the ribbon will in due course fold in the movable wall so as to locate the pin 607 out of the path of the hook on the end of the bar 608. The bar 608 has a hook on its opposite end and the spool at the right side of Fig. 6 has a fixed and movable wall, above described. The bar 608 has an upward extension carrying two collars 609 slidingly mounted on the shaft 599. Between these collars and members affixed to the shaft are springs 610, one of said springs being interposed between each collar and fixed member of the shaft. The purpose of this yielding connection is to take care of any cocking of the teeth between gears 603 and 602. If the gears are cocked, that is, not brought into proper registration when the bar 608 is moved, one of the springs 610 will be compressed until by the next rotation of the shaft 599, the teeth of the gears are brought into proper mesh.

There is a centering device for holding the shaft 599 in its two positions, this consisting of the bar 611, having a roller on its upper end which drops into either one of two V-shaped grooves 612, cut in the shaft 599. A spring 613 holds this roller against the shaft (see Figs. 6 and 7).

The ink ribbon 600 passes over vertically disposed guide rollers 614 and angularly disposed guide rollers 615. 616 are ribbon guides carried by arms 617 mounted on the shaft which supports the type segments. These ribbon guides are held in their outer position by means of springs 618 and have a slot and pin connection with the arms 617. (See Figs. 18 and 19). The purpose of this is to enable said guides to be pressed inwardly by the platen at each type impression and afterward the guides move the ribbon away from the type so as not to interfere with subsequent movement of the type. The type are of course held stationary during the printing impression as is also the ribbon and the paper feeding mechanism, heretofore described. The ink ribbon is fed just before each type impression, while the line spacing or paper feeding mechanism, when in position for paper feeding operation, is operative only after a type impression.

*Eliminating the printing of items on the tally-roll.*

The machine, as described up to this point, contemplates the printing of items on the tally-roll corresponding to the printing of items by the typewriter carriage. Of course, in speaking of "printed items", I refer to those items which are recorded corresponding to numbers introduced into the adding mechanism of the machine and which are recorded on the sheet of paper carried by the typewriter carriage. As before stated, whenever the bar 577 is permitted to occupy its forward position, no printing can be effected on the tally-roll. Therefore, it is necessary to adjust the blocks 578 to positions wherein the bar 577 will be forced rearwardly at the proper time to cause a record to be made on the tally strip. It follows, therefore, that if the blocks 578 are moved, the bar 577 will not be pushed rearwardly at the end of a tabulating operation and obviously certain of the blocks may be removed to obviate item printing in certain columns and permit item or total printing in other columns. I will assume, for the purposes of the present description, that it is not desired to print items in any one of the columns on the tally strip, but that it is desired to record only the totals thereof as said totals are yielded from the wheels 119 and 268 and recorded on the sheet of paper carried by the typewriter carriage. To do this, it is necessary to place the printing on the tally strip under control of the two total keys marked "T" and "R. T." (meaning "total" and "rear total") in Fig. 2.

Referring now to the construction disclosed in Figs. 2, 5 and 25, it will be seen that when the total key (marked "T" in Fig. 2) is depressed, it will pull forwardly a bar 170, thereby rocking a lever 172. This lever is connected by a link 174 to a bell crank lever 173 having a forward extension which engages a pin on a bar 113, connected to the frame 49, so that when the total key is depressed, the wheels 119 are brought into engagement with the racks 100. The bell crank 173 also has a rearward extension lying under a member 180 of a bell crank which shifts the cams 82—109, (see Figs. 25 and 32) moving them in their central or neutral position. The operation of the total key through the link 185 lifts the tappet 84 out of the path of pin 83 and thus prevents the lifting of frame 58 which carries the setting up pins 63.

In my present construction, in addition to carrying out the above operation of the printing mechanism upon the depression of the total key to record the total on the sheet of paper carried by the typewriter carriage, I also effect the printing of such total on the tally strip, I provide the bar 577 with a shoulder 577$^b$ (see Figs. 5 and 22) in front of which lies a bell crank lever 620 (see Fig. 25) pivoted to a bracket on the frame of the machine and which bell crank lever has a slot and pin connection with a bar 621 having a pin 622 on its lower end lying under the forward extension 172$^a$ of bell crank 170. In this manner, whenever the total key is depressed, the bar 621 is pulled downwardly and through the bell crank 620, the bar 577 is moved to the rear so that the printing devices of the tally-roll attachment are brought into operation so as to print the totals of the columns. Of course the printing of the totals of the columns, as controlled by the total key, just described, can be used in connection with the printing of the items on the tally strip, if desired.

The total key for the rear register wheels 268 may have its extension 304 located over the pin 622 (see Fig. 25$^a$) so that when this key is depressed, the total, as represented in the wheels 268, will also be recorded on the tally strip.

I do not deem it necessary to refer in detail to the parts controlled by the rear total key except to say that when it is depressed, in addition to pulling down the link 185, before described, pulling down bar 621, in the present application, causing the wheels 268 to mesh with the racks, shifting the cams 82—109 to their second or neutral position, the depression of said rear total key will also lift the lever 102$^a$.

I have not herein referred to the operation of subtraction, which is necessary in making out statements where the difference between debits and credits has to be determined, but it is obvious that this can be done in the type of calculating machine shown, in the manner disclosed in the U. S. Letters Patent to Hubert Hopkins, No. 1,118,489, dated November 24, 1914. Indeed, in Fig. 4, I have shown part of the mechanism identified with the multiplying devices of the French patent and the subtracting mechanism of said Hopkins Patent No. 1,118,489.

In Fig. 4, 231 is a sliding bar having a tooth 232 for engagement with the segment 233 whereby the pendants 235 may be positioned over the lifting bars 247. The pendants are each slidable upon the arm 236 of a vertically movable bar 239 having a stepped portion 243 to coöperate with a stop projection 242 on the rack 100, these parts being in all respects similar to those shown and described in said French patent and said Hopkins Patent No. 1,118,489.

I have not deemed it necessary in the present application to disclose in detail the tabulating mechanism for the typewriter carriage as the same may be similar in all respects to that disclosed in U. S. Letters Patent No. 1,027,225, dated May 21, 1912, and No. 1,130,039, dated March 2, 1915, granted upon applications filed by me.

However, in Fig. 2, I have shown the adjustable blocks 9 which are mounted on bars 10 for controlling the point of operation of said tabulating mechanism.

The carriage return mechanism for the typewriter is not illustrated in detail as this may be similar in all respects to that illustrated in Patent No. 1,120,862, dated December 15, 1914, granted upon an application filed by me.

The use of the non-print key may not be required, but if such is desired, the mechanism employed in the Hubert Hopkins Patent No. 1,080,694, dated December 9, 1913, or any other desired form, may be employed. It is desirable, however, in the listing of designating characters, such as dates, customers' numbers, etc., to provide means for automatically preventing the accumulation of such numbers as the totals thereof are unnecessary. The mechanism shown in my pending application, Serial No. 759,493, filed April 7, 1913, may be employed for this purpose, or a modified form thereof, shown in Figs. 32 to 35, may be used.

In Fig. 32, 700 indicates the block mounted on notched shaft 39 (see also Fig. 2) which block has a rearward extension provided with faces $a$ and $b$ in different horizontal planes. These faces are designed to coöperate with a roller 701 on the end of a rock arm 702 connected to a sleeve 703 mounted on an extension of the shaft on which the carrying segments 129 are mounted. The opposite end of this sleeve carries an arm 704, connected by a link 705 by a yielding slot and pin connection, to the horizontal member 180 of the bell crank which shifts the cams 82—109 to the positions heretofore referred to, to wit, when said cams occupy their normal positions, a number set up on the key board will be introduced into the forward totalizer wheels 119; when the cams occupy their central or neutral position, as in total-taking operations, upon the depression of the total key, or rear total key, which keys also draw down their respective register wheels into mesh with the racks 100; or when the cams are shifted to their third position to introduce a number into the rear totalizer wheels 268. It follows from this that, if the cams are shifted to their neutral or central position, without drawing either set of wheels 119 or 268 into mesh with the racks 100, a number set up on the key board will be represented by said racks, and recorded, but not introduced into either set of totalizer wheels. As the designating characters usually appear in the left-hand column of a sheet of paper, the block 700 is so adjusted on the rack 39 that when the typewriter carriage is positioned at its starting point, at the right, the face $a$ will engage the roller 701 and through the instrumentalities, above described, move the cams 82—109 to their neutral position. Thus the number represented by the racks will be printed on the sheet of paper supported by the typewriter carriage, and also on the tally strip, but not added into either set of totalizer wheels. This non-add position of the parts is shown in Fig. 33. When the typewriter carriage is shifted leftwardly, as shown in Fig. 34, the face $b$ will be located over the roller 701 and operate the parts so that the items set up in the first column at the left of the sheet of paper, will be introduced into the rear accumulator and there totalized. The next tabulation of the typewriter carriage, and consequent similar movement of the tally-roll carriage, will move the block 700 past the roller 701, thus permitting the cams to be shifted to their normal position in which numbers in succeeding columns will be successively introduced and accumulated in the forward totalizers.

I do not in this application claim the details of the ribbon reversing mechanism, as the same forms the subject-matter of a companion application.

I claim:

1. In an apparatus of the character described, the combination of a laterally movable paper carriage for supporting a sheet of paper on which numbers may be recorded in column order, two or more registers in which said numbers may be introduced and separately accumulated, means on said carriage for selecting the register which shall receive and accumulate numbers recorded in certain columns, another laterally adjustable paper carriage supporting a sheet of paper on which numbers, recorded on the first mentioned sheet, may be printed in identical column order, and a plurality of printing mechanisms for making such separate records.

2. In an apparatus of the character described, the combination of a laterally movable paper carriage for supporting a sheet of paper on which numbers may be recorded in column order, two or more registers in which said numbers may be introduced and separately accumulated, means on said carriage for selecting the register which shall receive and accumulate numbers recorded in certain columns, another laterally adjustable paper carriage for supporting a sheet of paper on which the numbers, recorded on the first mentioned sheet, may be printed in identical column order, a plurality of printing mechanisms for making such separate records, and means whereby any one of said registers may be prevented from accumulating the items recorded by said printing mechanism.

3. In an apparatus of the character described, the combination of a laterally movable paper carriage for supporting a sheet of paper on which numbers may be recorded in column order, two or more registers in which said numbers may be introduced and separately accumulated, means on said carriage for selecting the register which shall receive and accumulate numbers recorded in certain columns, another laterally adjustable paper carriage supporting a sheet of paper on which numbers, recorded on the first mentioned sheet, may be printed in identical column order, a plurality of printing mechanisms for making such separate records, and means whereby any one or all of said registers may be prevented from accumulating the items recorded by said printing mechanism.

4. In an apparatus of the character described, the combination of a laterally movable paper carriage for supporting a sheet of paper, a register into which items may be introduced and accumulated, a separate paper carriage, means for controlling the position of said second paper carriage by the position of the first, and printing means for making a record of the numbers accumulated in the register, on the sheet of paper carried by said second paper carriage.

5. In an apparatus of the character described, the combination of a laterally movable paper carriage for supporting a sheet of paper, a register into which items may be introduced and accumulated, a separate paper carriage, means for controlling the position of said second paper carriage by the position of the first, and a plurality of printing devices for simultaneously making a record of the numbers recorded in said register, on both of said sheets of paper.

6. In an apparatus of the character described, the combination of a laterally shiftable paper carriage, tabulating mechanism coöperating therewith, two or more registers in which items may be introduced and separately accumulated, a printing mechanism whereby said items may be recorded in column order on a sheet of paper supported by said carriage, as the same is tabulated, a second laterally movable carriage for supporting a sheet of paper on which the same numbers, recorded on said first mentioned sheet, may be recorded, in column order, a tabulating mechanism for said last mentioned carriage, means operated by the first mentioned carriage for effecting the tabulation of the second carriage, and a separate printing mechanism coöperating with a sheet of paper supported by said second carriage.

7. In an apparatus of the character described, the combination of racks, printing type positioned thereby, a removable casing or cover, a laterally movable paper carriage supported by said removable casing, tabulating mechanism, carriage return mechanism, and impression making devices for said carriage, a portion of all which mechanisms are supported upon and carried by said casing, and rendered thereby separable from other portions of said mechanism.

8. In an apparatus of the character described, the combination of a register and actuating devices therefor, a plurality of independently operable platens, a plurality of printing mechanisms for making separate records and the totals thereof introduced into said register on said platens respectively, and means under control of the operator for selecting which of said printing mechanisms shall be rendered operative.

9. In an apparatus of the character described, the combination of a register and actuating devices therefor, a plurality of independently operable platens, a plurality of printing mechanisms for making separate records of the items introduced thereinto, together with the totals thereof on said platen respectively, and independent means for disabling either or both of said printing mechanisms at the will of the operator.

10. In an apparatus of the character described, the combination of a register, denominational actuators therefor, a plurality of printing mechanisms for making separate records of the items introduced in said register, together with the totals thereof, and a laterally movable paper carriage, whose position controls the operativeness of said printing mechanisms.

11. In an apparatus of the character described, the combination of two or more registers in which items may be introduced and separately accumulated, a plurality of independently operable platens, a plurality of printing mechanisms for making separate records of the items introduced in said registers, or either of them, together with the totals thereof on said platens respectively, and independently operable paper carriages for supporting said platens, and which are capable of being separately positioned with respect to said different printing mechanisms.

12. In an apparatus of the character described, the combination of a register in which items may be introduced and accumulated, a plurality of printing mechanisms for making separate records of the items introduced in said register, together with the totals thereof, and two separately movable paper carriages coöperating with said printing mechanisms, the position of one of said carriages being automatically controlled by the position of the other.

13. In an apparatus of the character described, the combination of a register in which items may be introduced and accumulated, a plurality of printing mechanisms for making separate records of the items introduced in said register, together with the totals thereof, two separately movable paper carriages coöperating with said printing mechanisms, the position of one of said carriages being automatically controlled by the position of the other, and means for independently manipulating said carriages.

14. In an apparatus of the character described, the combination of a register and denominational actuators therefor, a plurality of printing mechanisms for making separate records of the items introduced in said register, and the totals thereof, a separately movable paper carriage for each printing mechanism, a separate escapement mechanism for each carriage, and independent means for operating said escapements.

15. In an apparatus of the character described, the combination of a register and denominational actuators therefor, a plurality of printing mechanisms for making separate records of the items introduced in said register, and the totals thereof, a separately movable paper carriage for each printing mechanism, a separate escapement mechanism for each carriage, and means for jointly returning said paper carriages to their home or starting position.

16. In an apparatus of the character described, the combination of a register in which items may be introduced and accumulated, a plurality of printing mechanisms for making separate records of the items introduced in said register, together with the totals thereof, a paper carriage for carrying a sheet of paper on which words may be printed, a word-printing mechanism including letter-spacing devices, a tabulating mechanism coöperating with said paper carriage whereby said carriage may be laterally spaced a predetermined number of letter spaces to receive printing impressions from the printing mechanism controlled by the adding mechanism, another paper carriage for supporting the paper which receives printing impressions from the other printing mechanism controlled by said adding mechanism, an escapement mechanism for tabulating this second mentioned paper carriage, and means on the first mentioned paper carriage for operating the escapement mechanism of the second mentioned paper carriage.

17. In an apparatus of the character described, the combination of two or more registers in which items may be introduced and separately accumulated, denominational actuators therefor, a plurality of printing mechanisms for making separate records of the items introduced in said registers, and the totals thereof, independently movable paper carriages coöperating with said plurality of printing mechanisms, and means whereby any one of said registers may be prevented from accumulating the items recorded by either of said printing mechanisms.

18. In an apparatus of the character described, the combination of a register, a series of denominational actuators therefor, means for determining the excursions of said actuators, a plurality of articulated printing mechanisms located at opposite ends of said actuators for recording numbers represented by the excursions of said actuators, independently movable paper carriages coöperating with said printing mechanisms, and means operated by the movement of one of said carriages for controlling the movement of the other.

19. In an apparatus of the character described, the combination of a series of denominational actuators, two or more registers shiftable with relation to said actuators whereby items may be introduced and separately accumulated in a selected register, a plurality of printing mechanisms for making separate records of the items introduced in said registers, and the totals thereof, and independently positionable paper carriages coöperating with said separate printing mechanisms.

20. In an apparatus of the character described, the combination of a laterally movable paper carriage for supporting a sheet of paper on which numbers may be printed in column order, two or more registers in which items may be introduced and separately accumulated, denominational actuators for said registers, a plurality of printing mechanisms for making separate records of the items introduced in said registers, one of said printing mechanisms being adapted to make a printing impression upon said sheet of paper, another laterally movable paper carriage for supporting paper on which numbers may be printed by another of said printing mechanisms, means on the first mentioned laterally movable paper carriage for positioning the second mentioned laterally movable paper carriage, and means on said first mentioned laterally movable paper carriage for determining the register in which the recorded items shall be introduced.

21. In an apparatus of the character described, the combination of a laterally movable paper carriage for supporting a sheet of paper on which numbers may be printed, a register in which items may be introduced and accumulated, denominational actuators therefor, a printing mechanism for recording said numbers and the totals thereon on said sheet of paper, another printing mechanism controlled by said denominational actuators, a separate paper carriage for supporting a sheet of paper for receiving the printing impressions from said other or last mentioned printing mechanism, and means whereby the records made by said last mentioned printing mechanism may consist of the items alone, the totals alone, or the items and totals thereof, together, at the will of the operator.

22. In an apparatus of the character described, the combination of denominational racks, means for determining the excursions thereof whereby the racks may be simultaneously positioned to represent different numbers, a register for accumulating the numbers represented by said racks, two sets of printing mechanisms located respectively at opposite ends of said racks, the type of which printing mechanisms are simultaneously positioned by said racks, independently operable impression-making devices including laterally shiftable platens coöperating with said type, and means whereby the lateral position of one of said platens controls the lateral position of the other of said platens.

23. In an apparatus of the character described, the combination of denominational racks, means for controlling the excursions thereof, whereby said racks are positioned to represent different numbers, a plurality of registers coöperating with said racks, means for determining which register, or registers, shall receive and accumulate the numbers represented by the racks, a set of printing type located at each end of said racks, and positioned thereby, and separately operated impression-making devices for coöperating with said printing type.

24. In an apparatus of the character described, the combination of a series of denominational racks, means for determining the excursions of said racks to represent different numbers, printing type carried by one end of said racks, impression-making devices for making a record of the number represented by said racks, printing segments meshing with the opposite ends of said racks, and independently operable impression-making devices coöperating with said printing segments.

25. In an apparatus of the character described, the combination of a series of denominational racks, means for determining the excursions of said racks to represent different numbers, printing type carried by one end of said racks, impression-making devices for making a record of the number represented by said racks, printing segments meshing with the opposite ends of said racks, independently operable impression-making devices coöperating with said printing segments for making a separate impression therefrom, and adding mechanism coöperating with said racks.

26. In an apparatus of the character described, the combination of a laterally shiftable paper carriage for supporting paper, printing devices for making a printing impression on said paper, adjustable stops on said carriage, tabulating mechanism for said carriage, a second laterally shiftable paper carriage for supporting paper, independent printing devices for making separate printing impressions on said last mentioned paper, tabulating mechanism coöperating with said last mentioned carriage, the stops on the first mentioned carriage controlling the tabulating mechanism of the second mentioned carriage, and independently operable manipulative devices for independently controlling the tabulating movements of said carriages.

27. In an apparatus of the character described, the combination of a laterally movable paper carriage, tabulating mechanism coöperating therewith, a carriage return mechanism coöperating therewith, a second paper carriage, an independent tabulating mechanism, an independent carriage return mechanism coöperating with said second carriage, and means on the first carriage for controlling the tabulation and carriage return mechanism of said second carriage.

28. In an apparatus of the character described, the combination of a laterally movable paper carriage, tabulating mechanism coöperating therewith, a carriage return mechanism coöperating therewith, a second paper carriage, an independent tabulating mechanism, an independent carriage return mechanism coöperating with said second carriage, and adjustable means on the first carriage for controlling the tabulation and return of said second carriage.

29. In an apparatus of the character described, the combination of a laterally movable paper carriage having a platen, a series of adjustable tripping blocks carried thereby, a second laterally movable paper carriage having a platen, independent tabulating mechanisms therefor, independent carriage return mechanisms therefor, and independently operated printing mechanism coöperating with the platens of said carriages, said mechanisms being rendered effective or ineffective by the position of the tripping blocks on the first mentioned carriage.

In testimony whereof I hereunto affix my signature, in the presence of two witnesses, this 11th day of May, 1916.

OTTO THIEME.

Witnesses:
M. P. SMITH,
M. A. HANDEL.